(12) United States Patent
Kanjlia et al.

(10) Patent No.: US 12,093,998 B2
(45) Date of Patent: *Sep. 17, 2024

(54) SYSTEMS AND METHODS FOR PROVIDING A USER INTERFACE FOR FACILITATING PERSONAL PAYMENT TRANSACTIONS

(71) Applicant: Capital One Services, LLC, McLean, VA (US)

(72) Inventors: Gagan Kanjlia, Frisco, TX (US); Scott Zimmer, Charlotte, NC (US); Robert J. Larson, San Angelo, TX (US); Alexander S. Wilson, Kennett Square, PA (US); Vishal Puri, McLean, VA (US); Jay F. Pober, Cherry Hill, NJ (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/940,278

(22) Filed: Sep. 8, 2022

(65) Prior Publication Data
US 2023/0105919 A1   Apr. 6, 2023

Related U.S. Application Data

(63) Continuation of application No. 17/030,117, filed on Sep. 23, 2020, now Pat. No. 11,538,102, which is a
(Continued)

(51) Int. Cl.
*G06Q 40/02* (2023.01)
*G06Q 20/10* (2012.01)
(Continued)

(52) U.S. Cl.
CPC ............. *G06Q 40/02* (2013.01); *G06Q 20/10* (2013.01); *G06Q 20/22* (2013.01); *G06Q 20/223* (2013.01);
(Continued)

(58) Field of Classification Search
None
See application file for complete search history.

(56) References Cited

U.S. PATENT DOCUMENTS

| | | | |
|---|---|---|---|
| 8,700,526 B1 * | 4/2014 | Cozens | G06Q 50/01 705/40 |
| 2010/0306091 A1 * | 12/2010 | Homer | G06Q 40/12 709/204 |
| 2013/0103577 A1 * | 4/2013 | Lawson | G06Q 20/405 705/39 |

* cited by examiner

*Primary Examiner* — Kito R Robinson
(74) *Attorney, Agent, or Firm* — Foley & Lardner LLP

(57) ABSTRACT

In some embodiments, one or more user interfaces for facilitating personal payment transactions may be provided. In some embodiments, one or more first interfaces may be generated for a payer to effectuate a personal payment transaction. A location of a user device associated with the payer may be obtained. Based on the obtained location of the user device, one or more suggested payees for presentation on the first interfaces may be provided. An indication of a selected payee (from the suggested payees) may be obtained from the payer via the first interfaces. Options to fund a personal payment to the selected payee may be provided for presentation on the first interfaces. One or more options for routing the personal payment associated with the personal payment transaction may be provided to the payer via the first interfaces.

20 Claims, 29 Drawing Sheets

Related U.S. Application Data continuation-in-part of application No. 16/166,619, filed on Oct. 22, 2018, now Pat. No. 10,885,579, which is a continuation of application No. 16/165,708, filed on Oct. 19, 2018, now Pat. No. 10,586,278, which is a continuation of application No. 14/267,421, filed on May 1, 2014, now abandoned, which is a continuation of application No. 14/109,017, filed on Dec. 17, 2013, now Pat. No. 10,068,288, said application No. 17/030,117 is a continuation-in-part of application No. 16/788,768, filed on Feb. 12, 2020, now abandoned, which is a continuation of application No. 14/108,808, filed on Dec. 17, 2013, now Pat. No. 10,565,571, said application No. 17/030,117 is a continuation-in-part of application No. 15/880,526, filed on Jan. 25, 2018, now abandoned, which is a continuation of application No. 14/108,926, filed on Dec. 17, 2013, now Pat. No. 10,354,237.

(60) Provisional application No. 61/738,101, filed on Dec. 17, 2012, provisional application No. 61/739,340, filed on Dec. 19, 2012, provisional application No. 61/738,104, filed on Dec. 17, 2012.

(51) Int. Cl.
*G06Q 20/22* (2012.01)
*G06Q 20/32* (2012.01)
*G06Q 20/40* (2012.01)
*G06Q 30/02* (2023.01)
*G06Q 40/03* (2023.01)

(52) U.S. Cl.
CPC ..... *G06Q 20/3223* (2013.01); *G06Q 20/4014* (2013.01); *G06Q 30/02* (2013.01); *G06Q 40/03* (2023.01)

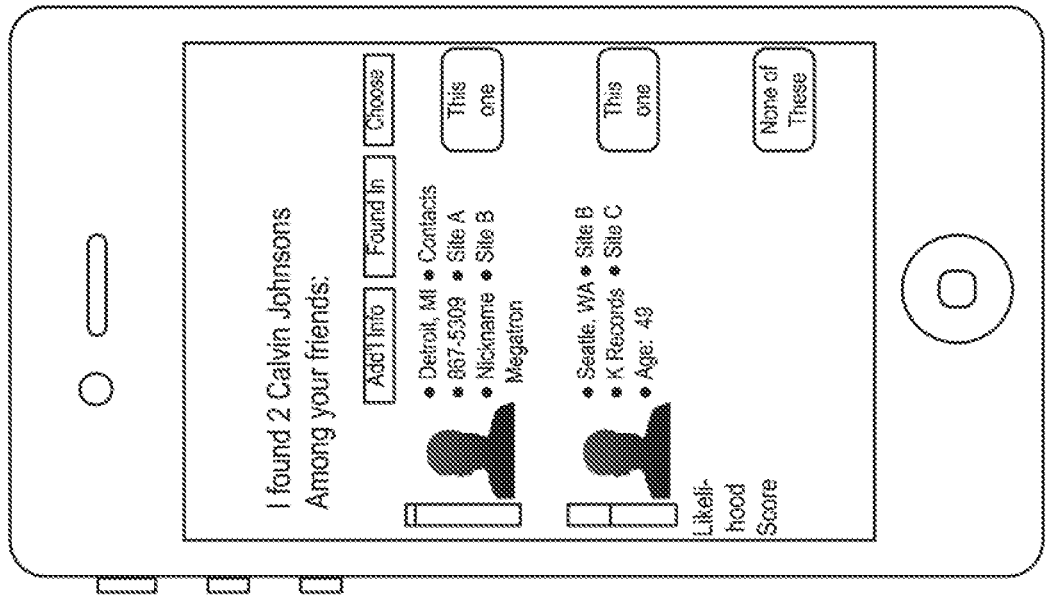
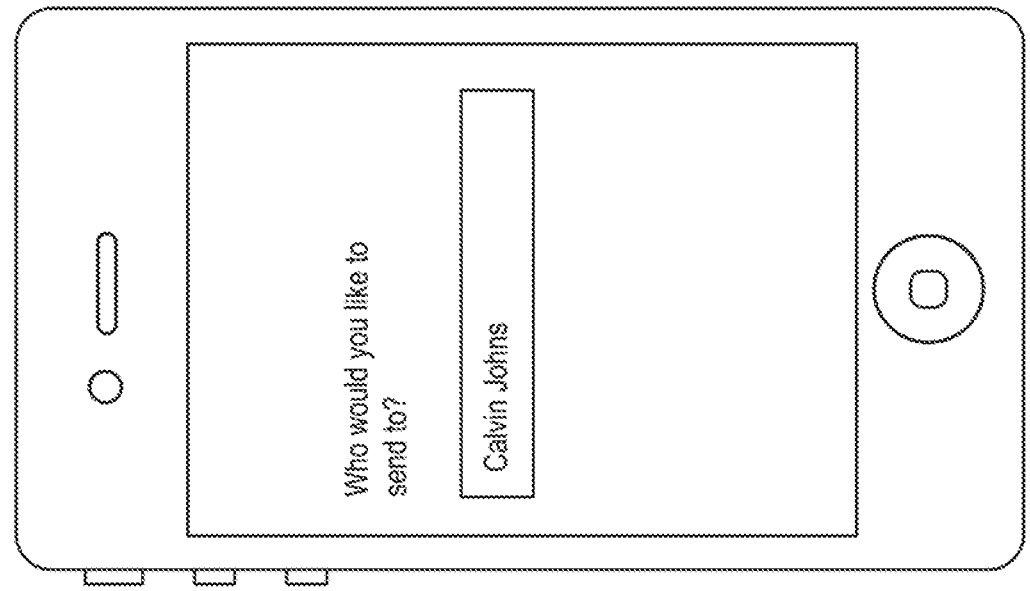
FIG. 5B

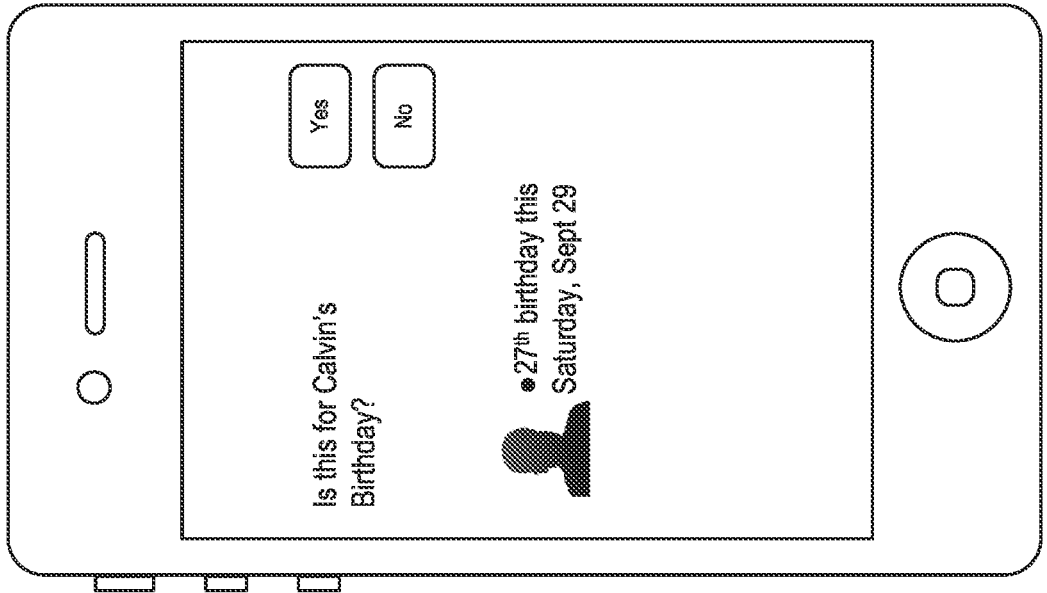
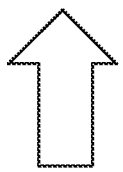
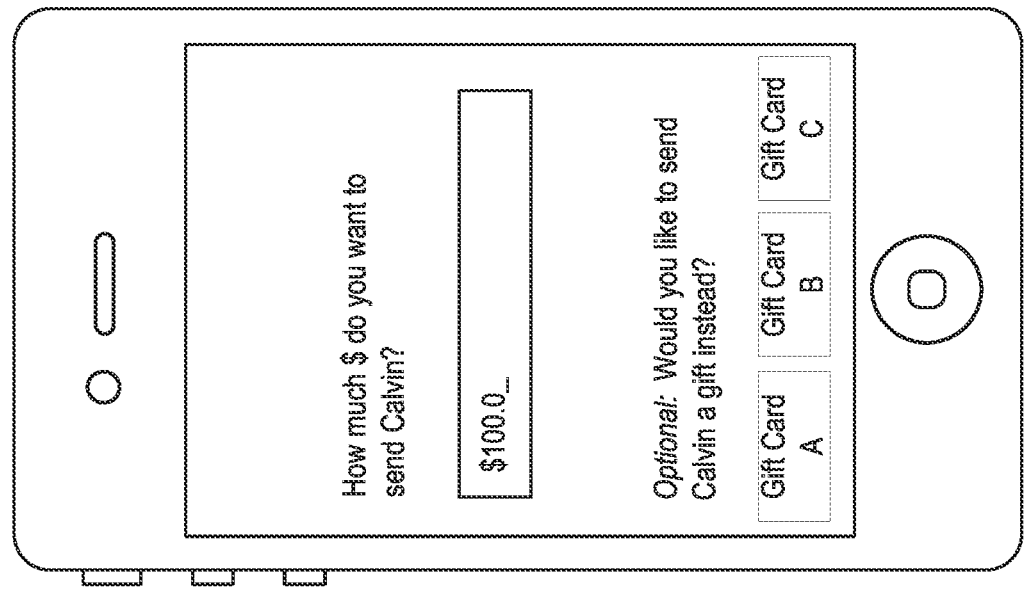
FIG. 5C

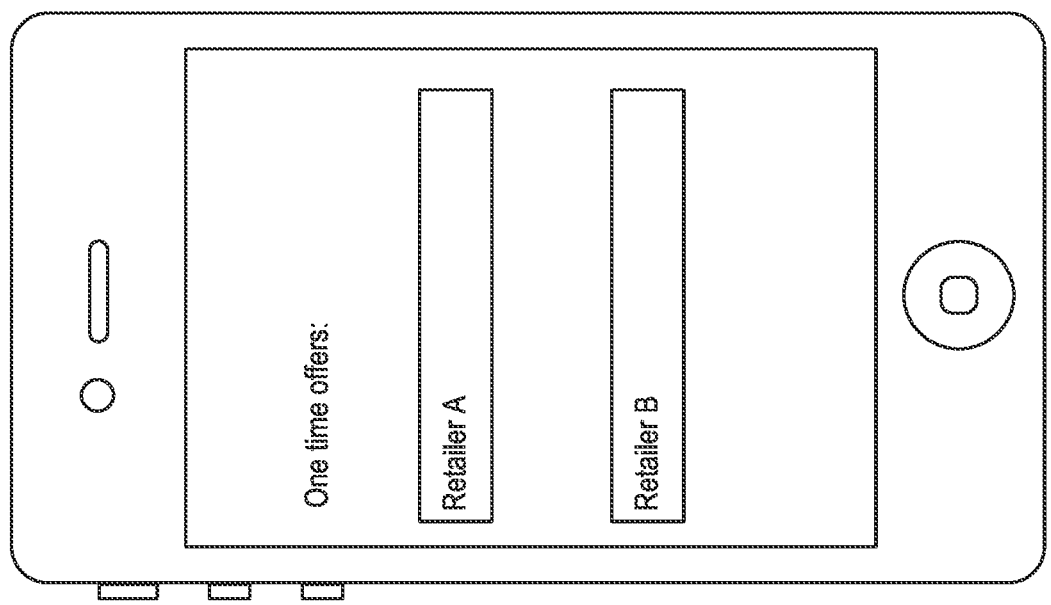

SYSTEMS AND METHODS FOR PROVIDING A USER INTERFACE FOR FACILITATING PERSONAL PAYMENT TRANSACTIONS

CROSS-REFERENCE TO RELATED APPLICATIONS

This application is a continuation of U.S. patent application Ser. No. 17/030,117, filed on Sep. 23, 2020, which is a continuation-in-part of U.S. patent application Ser. No. 16/166,619, filed on Oct. 22, 2018, which is a continuation of U.S. patent application Ser. No. 16/165,708, filed on Oct. 19, 2018, which is a continuation of U.S. patent application Ser. No. 14/267,421, filed on May 1, 2014, which is a continuation of U.S. patent application Ser. No. 14/109,017, filed on Dec. 17, 2013, which claims priority under 35 U.S.C. § 119 to U.S. Provisional Patent Application No. 61/738,101, filed on Dec. 17, 2012. U.S. patent application Ser. No. 17/030,117 is also a continuation-in-part of U.S. patent application Ser. No. 16/788,768, filed on Feb. 12, 2020, which is a continuation of U.S. patent application Ser. No. 14/108,808, filed on Dec. 17, 2013, which claims priority under 35 U.S.C. § 119 to U.S. Provisional Patent Application No. 61/739,340, filed on Dec. 19, 2012. U.S. patent application Ser. No. 17/030,117 is also a continuation-in-part of U.S. patent application Ser. No. 15/880,526, filed on Jan. 25, 2018, which is a continuation of U.S. patent application Ser. No. 14/108,926, filed on Dec. 17, 2013, which claims priority under 35 U.S.C. § 119 to U.S. Provisional Patent Application No. 61/738,104, filed on Dec. 17, 2012. The above-referenced applications are each incorporated herein by reference in their entireties.

FIELD

The disclosed embodiments generally relate to payment systems, and more particularly, to systems, processes, and computer programs for facilitating users to effect personal payment transactions.

Electronic personal payment transactions, such as person-to-person payment and person-to-business payment, represent a rapidly growing industry. Current personal payment systems, however, are often inflexible and inconvenient. There is no payment gateway where money movement may be completed through a singular portal irrespective of payment medium. For example, a payee may have to create an account with a financial service provider in order to collect the payment delivered by that financial service provider. Another example of the inflexibility of existing personal payment systems is the lack of customization with respect to sending and receiving payment. For example, current systems do not provide mechanisms to aid and facilitate decisions surrounding the potential routing of payments for both generic and specific types of payments.

Lack of flexible and distinct payment channels may cause the user to research different payment platforms. This may also require the user to look up information, and make complex multiple parameter evaluations with regards to overall functionality of a given transaction. Moreover, the payer is offered no flexibility or optionality with regards to the sourcing of the funds. In addition, the payee is usually not offered options as to how the payment should be received, and consequently, the payee has no influence over the cost, the speed, user-friendliness, and the stability of the payment route.

Furthermore, existing personal payment systems may cause users inconveniences due to the lack of mechanisms that could minimize the efforts of the payer to initiate or complete a payment transaction. For example, the payer may have to spend a considerable amount of time to set up an account to effect a transaction or manually look up the payee's information (e.g., the payee's bank account number) in order to set up and complete a transaction. As another example, the payer and the payee may not freely choose a payment rail or the payee may not be able to withdraw the payment immediately if the payee receives a check that deposited into his bank account.

Moreover, existing personal payment systems are built around the system provider's needs rather than the needs or desires of their customers. Current systems thus focus on merely effecting the payment itself, with limited additional interaction with the users. Currently systems also provide limited mechanisms for the payee to initiate a transaction, such as, for example, initiating a payment transaction by requesting payment from the intended payer. For example, current systems may provide the same user interface to all the users, without considering an individual's preference, technical experience, and transactional histories.

Furthermore, existing personal payment systems have limited functionality to facilitate group or crowd payments/collections. Existing personal payment systems also lack mechanisms that, for example, provide feedback to users with respect to the status of payments or how they were received.

Moreover, existing personal payment systems provide no way for payers to easily look up payee information. Rather, payers typically need to pre-collect payee information (such as routing numbers and account numbers) and cannot rely on outside sources to supplement/verify account information. This can lead to payments going to incorrect payees as well as general lack of confidence in the payment system.

Thus, existing personal payment systems are limited, inflexible, inconvenient, and not personalized. It is therefore desirable to provide mechanisms that allow users to easily and efficiently to effect personal payment transactions.

SUMMARY

Systems and methods for providing personal payment processes are described. In some embodiments, systems, methods and computer programs are disclosed for providing a user interface that provides mechanism for a user to easily and accurately complete personal payment transactions. Disclosed embodiments include mechanisms that generate a dynamic and personalized interface to assist a payer to effect a payment transaction. The mechanisms may include software that when executed by a processor generate information used to display, via a customized interface, suggested recipients associated with the payment transaction for identifying a payee, and information used to display, to the payer via the customized interface, funding source(s) to fund the payment transaction. In some embodiments, the software, when executed, may generate information used to display, via the customized interface, routing option(s) to rail the payment and provide, via the customized interface, channels for the payer and the payee to communicate.

Disclosed embodiments further include systems, methods and computer programs—for example, Application Programming Interfaces (APIs)—for allowing a user to easily and accurately complete personal payment transactions. Disclosed embodiments include mechanisms that generate a dynamic and customized interface for a payer for effecting a personal payment transaction, identify possible payees via social networks, local databases or contact lists, or public identity databases, provide suggested recipients to the payer for identifying the payee based on the identifying information received from the payer, provide funding and routing options to the payer and/or the payee for routing the payment associated with the personal payment transaction, and provide channels for the payer and the payee to communicate. Further disclosed embodiments enable a payee to determine the payer's identity based on interactions with databases of identity information. Further disclosed embodiments also enable interaction with multiple diverse payment networks and gateways to facilitate transfer of payments and related information flows.

Disclosed embodiments also include mechanisms for generating a dynamic and customized interface for a payer to effect a personal payment transaction, receive some identifying information about a payee from the payer via the customized user interaction, provide suggested recipients to the payer for identifying the payee based on the identifying information received from the payer, provide funding options associated with the personal payment transaction to the payer, provide routing options to the payer and/or the payee for routing the payment associated with the personal payment transaction, and provide channels for the payer and the payee to communicate.

Consistent with some disclosed embodiments, tangible computer-readable storage media may store program instructions that are executable by one or more processors to implement any of the processes disclosed herein.

It is to be understood that both the foregoing general description and the following detailed description are exemplary and explanatory only, and are not restrictive of the disclosed embodiments.

BRIEF DESCRIPTION OF THE DRAWINGS

The accompanying drawings, which are incorporated in and constitute a part of this specification, illustrate various embodiments and embodiments of the disclosed embodiments, and together with the description, serve to explain the principles of the disclosed embodiments.

FIG. 5B is a screenshot of an exemplary intended payee identification interface, in accordance with various embodiments.

FIG. 5C is a screenshot of an exemplary payment amount and type interface, in accordance with various embodiments.

FIG. 7B is a screenshot of an exemplary interface for redirecting a received payment, in accordance with various embodiments.

DESCRIPTION OF THE EMBODIMENTS

Figure 1:
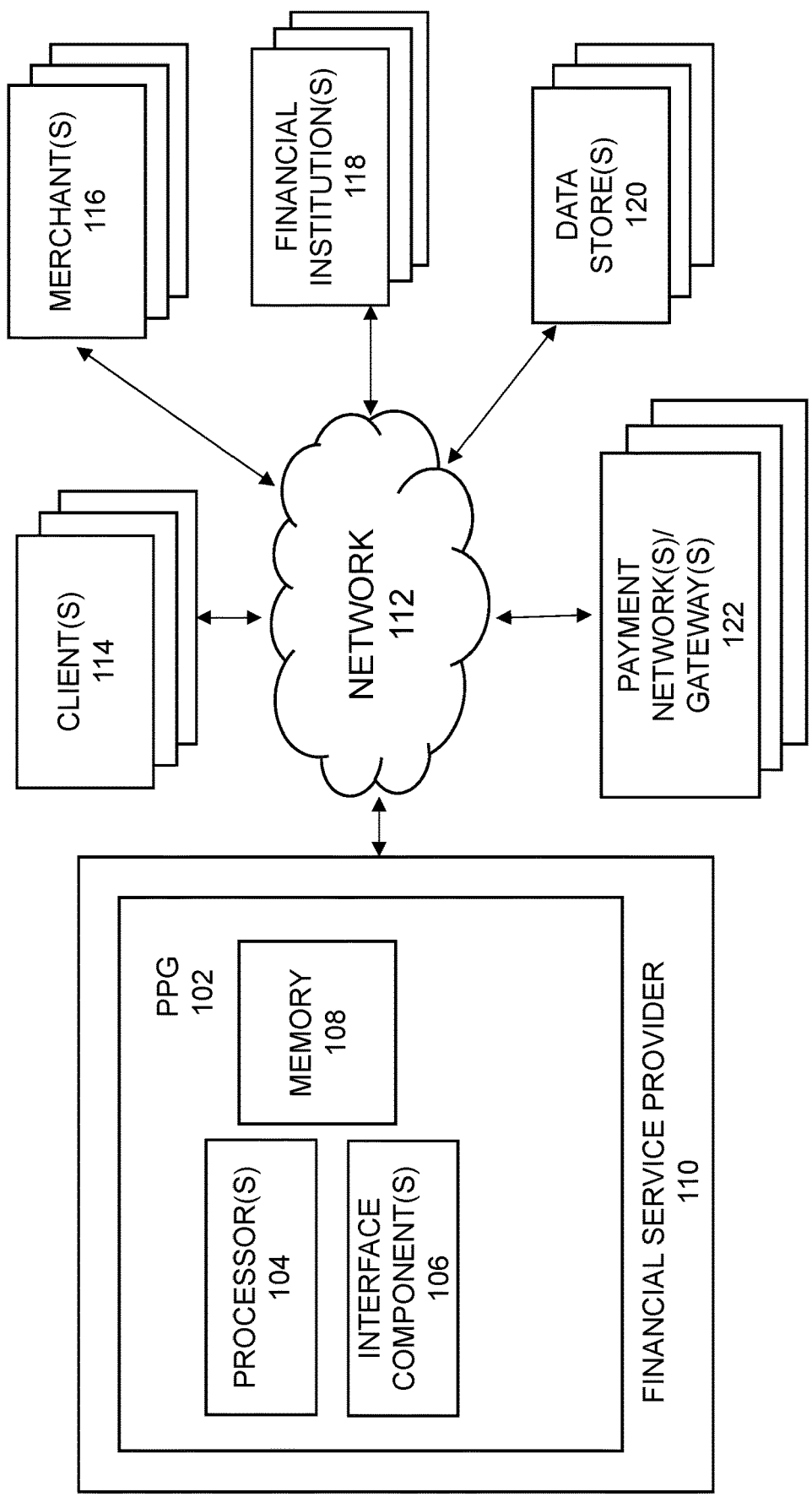
FIG. 1 is diagram of an exemplary system that may be used to implement disclosed embodiments.

It is to be understood that the following detailed description is exemplary and explanatory only and is not restrictive of disclosed embodiments. For example, steps or processes disclosed herein are not limited to being performed in the order described, but may be performed in any order, and that some steps may be omitted, consistent with the disclosed embodiments.

Reference will now be made in detail to exemplary embodiments, examples of which are illustrated in the accompanying drawings and disclosed herein. Wherever convenient, the same reference numbers may be used in the drawings and the following description to refer to the same or similar parts. Also, similarly named elements may perform similar functions and may be similarly designed. Numerous details are set forth to provide an understanding of the embodiments described herein. In some cases, the embodiments may be practiced without these details. In other instances, well-known techniques and/or components may not be described in detail to avoid obscuring described embodiments. While several exemplary embodiments and features are described herein, modifications, adaptations, and other implementations may be possible, without departing from the spirit and scope of the disclosure. Accordingly, the following detailed description does not limit the disclosure. Instead, the proper scope of the disclosure is defined by the appended claims.

FIG. 1 shows an exemplary system 100 configured to perform one or more processes consistent with the disclosed embodiments. In some embodiments, one or more components of system 100 may be configured to execute one or more software processes to provide one or more embodiments of the disclosed embodiments. The components and arrangement shown in FIG. 1 are not intended to be limiting to the disclosed embodiment as the components used to implement the processes and features disclosed herein may vary.

In accordance with disclosed embodiments, system 100 may include financial service provider 110, Personal Payment Genie ("PPG") 102, network 112, one or more clients 114, one or more merchants 116, and one or more financial institutions 118. System 100 may include other components to provide, collect, process, and transmit information consistent with the disclosed embodiments.

Personal Payment Genie ("PPG") 102 may be a computer-based system including computer system components, such as one or more servers, desktop computers, workstations, tablets, hand held computing devices, memory devices, and/or internal network(s) connecting the components. In some embodiments, PPG 102 may be a server that includes one or more processor(s) 104, memory devices, such as memory 108, and interface components 106. PPG 102 may be a single server or may be configured as a distributed computer system including multiple servers or computers that interoperate to perform one or more of the processes and functionalities associated with the disclosed embodiments. In some embodiments, PPG 102 may be a server that is associated with financial service provider 110. Financial service provider 110 may represent, for example, a bank, a merchant, a credit card provider, or any other entity that provides financial services to customers. In some embodiments, financial service provider 110 may be an institution or an individual that collects and processes personal payment for some transactions, and transfers the personal payment to one or more intended payees. In other embodiments, the functionalities performed by PPG 102 as disclosed herein may be software that is executed by one or more processors associated with financial service provider 110. That is, instead of being computer-based system with hardware and software, PPG 102 may represent software instructions stored in a memory (without hardware components) that are executed by a processor associated with financial service provider 110.

Processor(s) 104 may be one or more known processing devices, such as a microprocessor from the Pentium family manufactured by Intel or the Turion family manufactured by AMD. Processor(s) 104 may include a single core or multiple core processor system that provides the ability to perform parallel processes simultaneously. For example, processor(s) 104 may be a single core processor that is configured with virtual processing technologies known to those skilled in the art. In some embodiments, processor(s) 104 may use logical processors to simultaneously execute and control multiple processes. Processor(s) 104 may implement virtual machine technologies, or other similar known technologies to provide the ability to execute, control, run, manipulate, store, etc. multiple software processes, applications, programs, etc. In other embodiments, processor(s) 104 may include a multiple-core processor arrangement (e.g., dual or quad core) that is configured to provide parallel processing functionalities to allow PPG 102 to execute multiple processes simultaneously. One of ordinary skill in the art would understand that other types of processor arrangements could be implemented that provide for the capabilities disclosed herein.

PPG 102 may also include one or more storage devices configured to store instructions used by processor(s) 104 (or other components) to perform some functions related to the disclosed embodiments. In one example, PPG 102 may include memory 108 that includes instructions to enable processor(s) 104 to execute one or more applications, such as server applications, network communication processes, or any other type of application or software available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

Methods, systems, and computer programs consistent with the disclosed embodiments are not limited to separate programs or computers configured to perform dedicated tasks. For example, PPG 102 may include a memory that may include one or more programs to perform one or more functions for multiple user display control. Moreover, processor(s) 104 may execute one or more programs located remotely from system 100. For example, system 100 may access one or more remote programs, that, when executed, perform functions related to disclosed embodiments. Memory 108 may include one or more memory devices that store data and instructions used to perform one or more features of the disclosed embodiments. Memory 108 may also include any combination of one or more databases controlled by memory controller devices (e.g., server(s), etc.) or software, such as document management systems, Microsoft SQL databases, SharePoint databases, Oracle databases, Sybase databases, or other relational databases.

PPG 102 may also be communicatively connected to one or more memory devices (e.g., databases) locally or through a network. The remote memory devices may be configured to store information and may be accessed and/or managed by PPG 102. By way of example, the remote memory devices may be document management systems, Microsoft SQL database, SharePoint databases, Oracle databases, Sybase databases, or other relational databases. Systems, processes, computer programs, and tangible computer-readable medium of disclosed embodiments, however, are not limited to separate databases or even to the use of a database.

PPG 102 may also include one or more I/O devices that may comprise one or more interfaces for receiving signals or input from input devices and providing signals or output to one or more output devices that allow data to be received and/or transmitted by PPG 102. For example, PPG 102 may include interface components 106 that may provide interfaces to one or more input devices, such as one or more keyboards, mouse devices, and the like, that enable PPG 102 to receive data from one or more users such as client(s) 114. Furthermore, interface components 106 may include components configured to send and receive information between components of PPG 102 or external to PPG 102, such as network 112.

Network 112 may be any type of network that provides communications, exchanges information, and/or facilitates the exchange of information between PPG 102 and client(s) 114. In some embodiments, network 112 may be the Internet, a Local Area Network, or other suitable connection(s) that enables system 100 to send and receive information between the components of system 100.

Client(s) 114 may be one or more computer systems. For example, client(s) 114 may include a general purpose or notebook computer, a mobile device with computing ability, a server, a desktop computer, tablet, or any combination of these computers and/or affiliated components. For example, client(s) 114 may be a smartphone, which is adopted to perform all the functions consistent with the disclosed embodiments. In some embodiments, each client may be a computer system or device that is operated by a user who is a customer or a potential customer of financial service provider 110. Client(s) 114 may be configured with storage that stores one or more operating systems that perform known operating system functions when executed by one or more processors. By way of example, the operating systems may include Microsoft Windows, Unix, Linux, Apple Computers type operating systems, Personal Digital Assistant (PDA) type operating systems, such as Microsoft CE, or other types of operating systems. Accordingly, embodiments of the disclosed invention will operate and function with computer systems running any type of operating system. Client(s) 114 may also include communication software that, when executed by a processor, provides communications with network 112, such as Web browser software, tablet or smart hand held device networking software, etc.

Merchant(s) 116 may include systems operated by, for example, online retailers and their affiliates, brick-and-mortar retailers and their affiliates, or the like. Merchant(s) 116 may be communicatively connected to other devices of system 100 through, for example, network 112 or direct connection. Merchant(s) 116 may receive and send payments consistent with disclosed embodiments.

Financial institution(s) 118 ("FI") may include one or more systems operated by, for example, one or more financial institutions other than financial service provider 110 (i.e. those not affiliated with or part of the institution operating financial service provider 110). FI 118 may be communicatively connected to other devices of system 100 via, for example, network 112 or direct connection. For example, FI 118 may be operated by a bank, a credit union, a banking cooperative, a money transmitter, a broker, payment service network, or the like. FI 118 may receive and send payments consistent with disclosed embodiments.

Data store(s) 120 may include systems operated by, for example, social network services, databases, search engines, identity aggregators, or the like. Consistent with disclosed embodiments, data store(s) 120 may store information allowing for the search and determination of a user's identity without having to know the complete account information. For example, knowledge of the user's identity, in some embodiments, can lead to the determination of the account information necessary to transfer/receive funds based on the information stored in data store(s) 120.

Payment network(s)/gateway(s) 122 may include systems operated by, for example, payment processors or networks (such as credit card processors interbank networks). Payment network(s)/gateway(s) 122 can, in some embodiments, enable flow of money and information between unrelated financial institution(s) 118.

Figure 2:
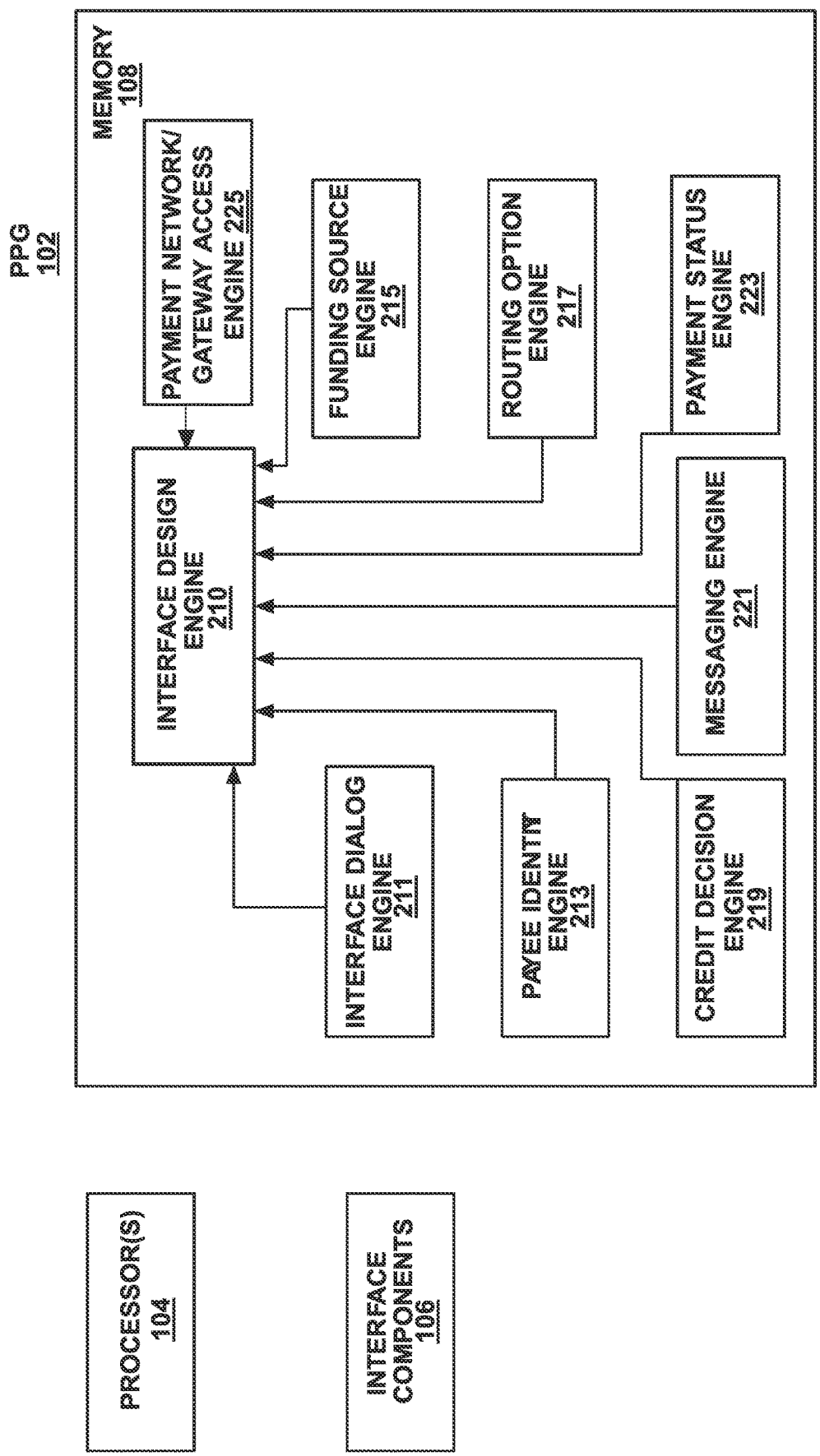
FIG. 2 is a diagram of exemplary engines for implementing some embodiments of disclosed embodiments.

FIG. 2 illustrates a diagram of an exemplary PPG 102 consistent with disclosed embodiments. In this example, PPG 102 may include a number of engines that may be, in some embodiments, used to implement disclosed embodiments. The disclosed "engines" (also known as "modules") may be implemented in software, hardware, firmware, a mix of any of those, or the like. For example, if the disclosed "engines" are implanted in software, they may be stored in memory 108 included in PPG 102. Processor(s) 104, interface components 106, and memory 108 may be utilized to perform processes to implement and facilitate operations of the illustrated engines in FIG. 2. The engines may include software, hardware, or firmware instructions (or a combination thereof) executable by one or more processors, such as processor(s) 104, alone or in various combinations with other engines disclosed in this or other embodiments. For example, interface design engine 210 may be configured to interact with other engines of PPG 102, shown or not shown in FIG. 2, to perform functions consistent with disclosed embodiments.

In one aspect, to provide a user-friendly and dynamic interface to effect a payment transaction, interface design engine 210 may be configured to customize a natural and intuitive interface for a particular user, such as a customer of financial service provider 110. The user may be associated with client 114, such as a customer of financial service provider 110 that uses a mobile device to perform online banking or other financial service processes. In some embodiments, interface design engine 210 may be configured to interact with interface dialog engine 211 to perform these functions.

In some embodiments, interface dialog engine 211 may be configured to dynamically determine an appropriate interface for the user. For example, based on the user's information including, for example, transaction history, profile, demographic information, behavior, information obtained from social networking sites, etc., interface dialog engine 211 may determine what type of interface that the user is most receptive to. In another example, if a user is technologically experienced, interface dialog engine 211 may determine whether the interface for this user will have a different look and feel from a user interface for another user who is less technologically experienced. In some embodiments, if a user is determined to be technically experienced, interface dialog engine 211 may be configured to provide more products and functions associated with the payment transaction; whereas for a user who is determined to be less technically experienced, interface dialog engine 211 may be configured to provide basic and less complex processes associated with the payment transaction. In other embodiments, if a user is young and/or a regular user of PPG 102, interface dialog engine 211 may be configured to provide a playful and colorful user interaction; whereas for a user who uses PPG 102 less frequently, interface dialog engine 211 may be configured to provide a user interaction having more user instructions and functional layout. Interface dialog engine 211 may also be configured to present different visual content (e.g., pictures, colors, and the like) to different users.

In other embodiments, interface dialog engine 211 may be configured to determine an appropriate voice that PPG 102 may use while interacting with a particular user, based on this user's preference or available user profiles. Interface dialog engine 211 may include software that when executed by a processor determines the type of technological experience of the user. For example, interface dialog engine 211 may include software that when executed by a processor may determine, based on one or more user profile information, that the user is highly educated (e.g., based on educational background information) or has experience with online processes (e.g., based on a number of social media or online-based accounts identified in the user profile data). As another example, interface dialog engine 211 may also include software that when executed by a processor, may determine the user's technical experience by using information including, for example, the user's age, input provided to interface dialog engine 211 for setting up the user interface (e.g., selecting manual input or voice input), commercial activities, and information gathered from other sources (e.g., social networking sites).

Based on the determination made by interface dialog engine 211, interface design engine 210 may be configured to customize an appropriate interface for a particular user. For example, interface design engine 210 may customize two different interfaces for two users who have different levels of technology skills for the same type of transaction (e.g., to provide the same financial service process for each user). In some embodiments, interface dialog engine 211 may determine the appropriate interaction mechanisms that PPG 102 may utilize while interacting with this particular user, based on the user's preference or available user profiles. For example, based on a user's information including, for example, transaction history, profile, demographic information, behavior, user's input provided to interface dialog engine 211 for setting up the interface, or information from social networking sites, etc., interface dialog engine 211 may customize a personalized user interface that this user is most likely receptive to (e.g. if a user likes to do everything by sending a message on Facebook, some embodiments of the disclosed embodiments may be performed via messaging using Facebook). As another example, interface dialog engine 211 may determine that a user prefers to use voice input to provide information used for a payment transaction. In this instance, interface design engine 210 may be configured to provide mechanisms that allow this user to perform financial service processes through voice-controlled inputs via client 114. Client 114 may be configured with voice translation software and/or hardware that translate voice input to digital signals that are processed and sent to PPG 102 for appropriate processing. For example, PPG 102 may receive information that a user has selected to use voice-controlled input via client 114. In response, interface design engine 210 may be configured to interact with interface dialog engine 211 to generate information that is provided mechanisms (e.g., an interface sent to client 114) that test whether PPG 102 and/or client 114 can accurately recognize and understand the user's voice input. In other embodiments, interface design engine 210 may be configured to generate information that is provided in an interface that allows the user to confirm whether client 114 and/or PPG 102 has accurately received and translated the user's voice-input. In some embodiments, interface dialog engine 211 may request the user to confirm the information collected via the voice-controlled input to ensure accuracy. Some embodiments may use known voice translation software and/or hardware for receiving, processing, and translating voice input from a user via client 114.

To minimize the user's efforts of providing information relating to the payment transaction, interface design engine 210 may be configured to generate information that is provided in an interface sent to client 114 that allows a payer to provide information regarding an intended payee. In one example, interface design engine 210 may generate information used in an interface sent to client 114 that displays one or more suggested recipients for identifying the payer's intended payee. In some embodiments, interface design engine 210 may be configured to interact with payee identity engine 213 to perform these functions.

For example, to minimize the payer's efforts of providing information relating to the payment transaction, based on the payer's input of one or more pieces information about his/her intended payee (e.g., the payee's name), payee identity engine 213 may be configured to provide one or more suggested recipients that could potentially be the payee of the payment transaction. Information about the payee may be provided in the form of voice, typing, token, shortlisted entry, or the like. In some embodiments, payee identity engine 213 may be configured to generate information that is provided in an interface sent to client 114 that provides suggested recipients of the payment based on one or more sources including, for example, the payer's phone contacts or electronic mail contact lists, social networking sites, the payer's website accounts, White Pages, checking account profile information, company databases having the contact information for both the payer and the payee, or the like.

Interface design engine 210 may also be configured to interact with payee identity engine 213 to determine one or more suggested recipients and an estimated level of confidence. In some embodiments, payee identity engine 213 may interact with data store(s) 120 to identify a recipient of funds. For example, payee identity engine 213 may interact with social networks such as Facebook, Google+, LinkedIn, Quora, Pinterest, Twitter, Yahoo, Orkut, Myspace, Badoo, Classmates.com, Foursquare, or the like. Additionally, payee identity engine 213 may interact with databases, such as contact lists on the user's mobile device (such as a mobile phone) or predefined savings/checking account contacts (e.g., entities/people/companies that the payer frequently transmits funds to). Furthermore, payee identity engine 213 may interact with public identity aggregators, such as white pages or other official/unofficial identity aggregators. All of these sources enable better identification of the payee's identity.

In some embodiments, payee identity engine 213 may be configured to estimate the level of confidence with respect to the identity of the intended payee by considering one or more factors including, for example, payment and/or other user history, the quality of the data source, probability of coincidence, the form of payment, the physical proximity and/or presence of the payer and intended payee, and others. In some embodiments, to better assist the payer to identify the payee and ensure accuracy, in some embodiments, payee identity engine 213 may be configured to estimate the level of confidence with respect to the identity of the intended payee, and provide an ordered list of the suggested recipients by the level of confidence. For example, once the payer provides the name and/or any other information about the intended payee, payee identity engine 213 may be configured to determine the confidence level for each of the suggested recipients. In some embodiments, the confidence level indicates the perceived likelihood that the suggested recipient(s) is the person that the payer intends to send the payment. The confidence level may increase if multiple independent data sources (such as the above-mentioned social networks, public identity aggregators, or databases) are utilized to suggest recipients of the payment. In some embodiments, payee identity engine 213 may be configured to consider one or more of the following factors to estimate the level of confidence: payment and/or other user history, the quality of the data source, probability of coincidence, the form of payment, the proximity between the payer and the intended payee(s), physical presence of the payer and/or the intended payee(s), and/or any other factors.

Interface design engine 210 may be configured to generate an interface that provides an ordered list of the suggested recipients based on the confidence level. FIG. 5B shows an exemplary interface associated with this embodiment. In some embodiments, interface design engine 210 may be configured to generate information that is provided in an interface sent to client 114 that includes one or more identification measures, for instance, pictures, address, phone numbers, and other data to assist the user in identifying an intended payee.

To ensure accuracy, payee identity engine 213 may be configured to provide mechanisms for the payer to confirm the identity of the payee. In some embodiments, payee identity engine 213 may be configured to provide sensory confirmation, such as vibrating or sound, to reflect the degree of confidence of the candidate payee(s). In other embodiments, payee identity engine 213 may also be configured to interact with interface design engine (not shown) to display, via the customized user interface for the payer, additional information about the suggested recipients (e.g. addresses, phone numbers, ages), the confidence level, and data sources used to suggest recipients.

To provide a flexible way to fund the payment transaction, in some embodiments, PPG 102 may execute instructions to generate information that is provided in an interface sent to client 114 that provide one or more options for the payer to fund his/her payment transactions. For example, interface design engine 210 may be configured to generate information that is provided in an interface sent to client 114 that includes these options to the payer to choose. In some embodiments, interface design engine 210 may be configured to interact with funding source engine 215 to perform one or more of these functions.

In some embodiments, funding source engine 215 may be configured to determine available funding sources to fund the payment. The available funding source may be internal or external to financial service provider 110. For example, in some embodiments, a user wishing to transfer money to another person may not need to have an existing account (or open a new account) with financial service provider 110 in order to fund the payment transaction. Funding source engine 215 may be configured to consider one or more factors to estimate preferred funding sources, and determine which one(s) to be suggested to the payer by an interface that is provided by PPG 102 to client 114. For example, to determine preferred funding sources for the payer, funding source engine 215 may consider one or more factors including, such as, account transaction history, time, costs, available balance, available credit, pending transactions (both credit and debit), etc. In some embodiments, funding source engine 215 may be configured to determine a plurality of funding sources for the payer. In one aspect, interface design engine 210 may be configured to interact with funding source engine 215 to determine the suggested funding options and preferred funding source(s), and to generate information that is provided in an interface sent to client 114 to display the preferred funding source(s), or alternatively, all suggested funding options, via the interface.

To provide more flexibility as to how to send payment and how to receive payment associated the payment transaction, interface design engine 210 may be configured to generate information that is provided in an interface sent to client 114 that provides routing options to rail the payment that may be selected by the user of client 114 (e.g., as a payer and/or the payee). Railing a payment may refer to, for example, selecting a method for transferring funds from the payer to the payee. For example, interface design engine 210 may be configured to provide an interface allowing the user of client 114 to select book transfers (e.g., when both the payer and the payee have accounts with financial service provider 110) or select payment rails that involve more than one payment systems (e.g., when the user of client 114 makes an international remittance). Examples of domestic rails are MasterCard Network, Visa Network, ACH, Fedwire, PayPal, Dwolla, etc. In some embodiments, interface design engine 210 may be configured to interact with routing option engine 217 to generate information that is provided in an interface sent to client 114 that includes one or more routing options to a payee. The same or similar interface may also be provided to the payer consistent with disclosed embodiments. In some embodiments, routing option engine 217 may consider one or more factors including, for example, type of payment, available information of the payee, locale of the payee, feedback and/or ranking of routes used in the past, historical behavior (e.g., route chosen in the past), and other data, to determine one or more suggested routing options. In other embodiments, routing option engine 217 may be configured to determine which payment rail or rails represent the best fit for the payment. For example, routing option engine 217 may be configured to rank the payment rails by one or more parameters including, for instance, history, safety, speed, cost, stability, user-friendliness, and other parameters.

Interface design engine 210 may be configured to interact with routing option engine 217 to determine one or more suggested routing options that may be the best fit for the payee and their relative rankings. Interface design engine 210 may be configured to generate information used in an interface sent to client 114 that includes the suggested best-fit routing option(s) along with their relative rankings for the payee to select. Alternatively, in some embodiments, interface design engine 210 may be configured to generate information that is provided in an interface sent to client 114 that includes multiple (e.g., all determined) suggested routing options via the interface. Additionally or alternatively, interface design engine 210 may also be configured to generate information that is provided in an interface sent to client 114 that includes options for the payee to enter his/her preferred routing for receiving the incoming payment via the interface if his/her preferred routing option is not included in the suggested routing options provided in the interface sent from PPG 102 to client 114. The payee's choice of the routing option may be fed back to routing option engine 217 for making future suggestions. In some embodiments, the payee may choose one or more routing options to receive the incoming payment. In other embodiments, routing option engine 217 may be configured to prevent the payee from receiving funds twice via different payment rails.

For some routing rails provided or chosen by the payer or the payee, the payment may not be delivered immediately. In some embodiments, interface design engine 210 may be configured to interact with credit decision engine 219 to determine one or more options for the payee to apply for a credit advance to receive immediate payment. Interface design engine 210 may be configured to generate information that is provided in an interface sent to client 114 that includes the one or more credit advance options for the payee. For example, in some embodiments, credit decision engine 219 may be configured to determine whether a payment rail provided or chosen by the payer and/or the payee involves a wait time or clearing period. Further, credit decision engine 219 may be configured to determine the payee's willingness to accept additional cost of expedited payment rails, for example, making the payment via wire transfers. Credit decision engine 219 may further be configured to determine the payee's eligibility for credit advance in order to speed up the availability of funds. Credit decision engine 219 may determine the payee's eligibility for credit advance by considering, for example, the pending payment transaction (e.g., whether the payment transaction will be successfully completed), payee's available balances in the payee's linked accounts (e.g., with financial service provider 110), employment status, transactional history with financial service provider 110, and information provided by credit scoring agencies (e.g., Equifax, TransUnion, Innovis, or Experian). Credit decision engine 219 may be configured to provide information to interface design engine 210 reflecting the determination that the payee is willing and eligible for credit advance. Based on that information, interface design engine 210 may be configured to generate information that is provided in an interface sent to client 114 that includes mechanisms that allow the payee to apply for the credit advance.

Once the payee receives the payment, in some embodiments, interface design engine 210 may be configured to generate information that is provided in an interface sent to client 114 that allows the payee to redirect the received payment by allocating them for one or more purposes. For example, interface design engine 210 may be configured to interact with routing option engine 217 to obtain suggested allocation options.

Figure 7A:
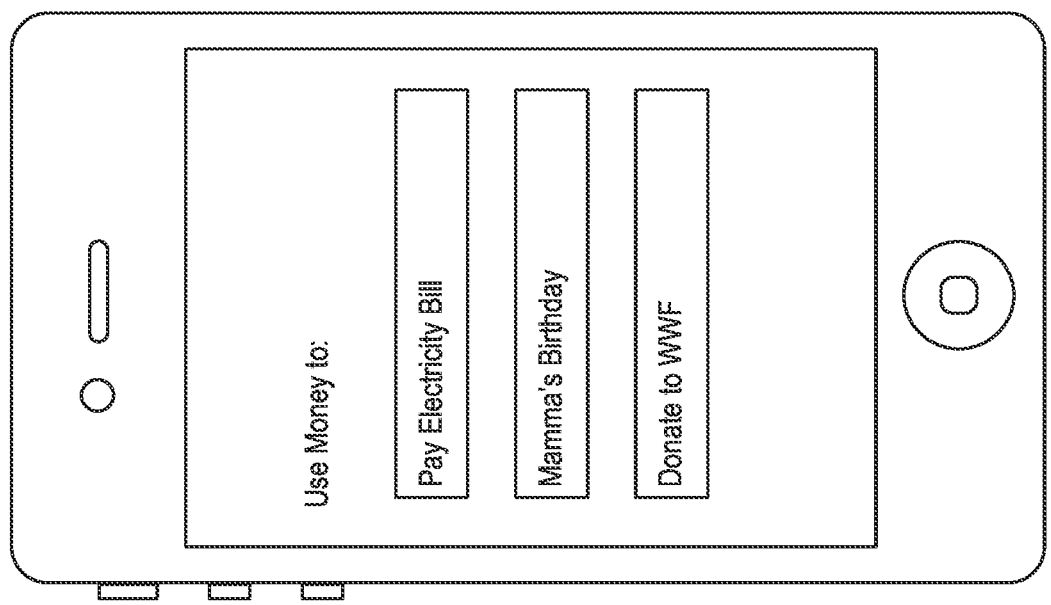
FIG. 7A is a screenshot of an exemplary interface for redirecting a received payment, in accordance with various embodiments.

In some embodiments, routing option engine 217 may be configured to determine the suggested allocation options based on information obtained from, for example, the payee's profile, transaction history, social networking websites, and the like. Additionally or alternatively, routing option engine 217 may be configured to determine allocation options based on the payee's location, which may be, for example, a restaurant, and a store. These allocation options may be provided to interface design engine 210. Interface design engine 210 may be configured to generate information that is provided in an interface sent to client 114 that includes the allocation option(s) for selection by the user. For example, interface design engine 210 may be configured to generate information that is provided in an interface sent to client 114 that includes one or more allocation options including, for example, putting payment towards phone bill, buying a pastry at a bakery nearby, buying candy bars for some children in the same store as the payee, buying items that are on the payee's wish list at online stores such as Amazon, or the like. FIGS. 7A and 7B show exemplary interfaces relating to redirecting payments.

In some embodiments, payments to 3rd party companies may be facilitated as well—for example, paying utility bills. Engines such as interface dialog engine 211, payee identity engine 213, and routing option engine 217, may also provide mechanisms for a payer to pay for items at a local brick-and-mortar store. This can involve, for example, determining the location of a user's device (e.g., one that implements PPG 102) and paying for a bill at a store located near to that device. The location of the payer may be determined, for example, using GPS information from the payer's mobile device, a social network update by the user that indicates a location, or any other source of location information.

The disclosed embodiments may perform processes that allow the payment process to be flexible and interactive. In one aspect, interface design engine 210 may be configured to perform one or more messaging functions during one or more of the payment transaction processes disclosed herein. In some embodiments, interface design engine 210 may be configured to generate information that is provided in an interface sent to client 114 that provides the user with one or more channels of communication, such as, for example, text messaging, email mechanisms, social networking sites, or the like. In some embodiments, interface design engine 210 may be configured to interact with messaging engine 221 to determine the most effective or preferred way of communication for a user based on one or more factors including, for example, information relating to email accounts, customer transaction history information (e.g., relating to financial service provider 110), information relating to a cell phone, social networking sites, and the like. For instance, messaging engine 221 may be configured to request, collect, maintain, and/or track information relating to the user's communication capabilities, such as particular social networking sites, email accounts, text messaging accounts, etc. Messaging engine 221 may provide that information to interface design engine 210 to generate information that is provided in an interface sent to client 114 that allows the user to communicate via one or more of the communication channels (e.g., a payer may choose to communicate with a payee during the payment transaction via text messages). Interface design engine 210 may be configured to determine the best-fit communication channels by considering the user's input provided to interface dialog engine 211 for setting up the interface (e.g., user's preference for one or more communication channels), user's contact list stored in client 114 (e.g., a smartphone or a tablet), historical activities, activities shown on social networking sites, etc. Messaging engine 221 may also be configured to provide information relating to the user's preference for communication channels to PPG 102. Based on the information, PPG 102 may determine the best-fit communication channel (s) to deliver messages to the user (e.g., send the user a reminder to make a payment). Examples of these communication channels may include, for example, SMS, MMS, emails, voice mail serves, social networking sites (e.g., Facebook, Twitter), and the like.

In other embodiments, interface design engine 210 may also be configured to interact with messaging engine 221 to determine the content of messages displayed to the payer and/or the payee by the interface. Interface design engine 210 may be configured to obtain this determination by interacting with messaging engine 221, and display messages by the interface sent to client 114 accordingly. In some embodiments, messaging engine 221 may consider factors including, for example, the type of payment, the payment triggering party, and other static and behavioral inputs in determining the appropriateness of the messaging. Messaging engine 221 may also determine the contents of messages based on other inputs such as regulations—including local, state, or Federal privacy and/or other legal regulations—capable of influencing commercial messaging and information exchange. Messaging engine 221 may also determine the content of messages based on further inputs, including transaction and behavior data (such as social network data), based on a determination of the appropriateness or success rate of a particular message with respect to the receiver of the message. For example, if a user is transferring money to a friend, messaging engine 221 may determine that the message should include an offer from a large retailer—for example, a retailer at which the sender has shopped during the past 6 months, has a linked credit account with, or has recently "liked" on a social media website. Other results are possible. In other embodiments, messaging engine 221 may also consider the occasion of payment in determining the content of the message to be displayed to the related parties.

Additionally or alternatively, PPG 102 may execute instructions to perform functions related to providing promotion offers to the user. To ensure the appropriateness of these commercial messages, messaging engine 221 may be configured to determine whether the commercial messages are desirable for a particular user or whether the particular user is likely to be responsive to the commercial messages. In some embodiments, messaging engine 221 may be configured to determine whether a user will be receptive to a particular offer by considering the user's inputs provided to interface dialog engine 211 (e.g., the user's preference for some types of commercial messages), historic payment behavior (e.g., shopped at or ordered products from a particular retailer), information relating to membership and/or loyalty program (e.g., has a bonus membership with a retailer), activities on social networking sites (e.g., regularly checked-in on Facebook at a some retail location), etc.

Messaging engine 221 may be configured to collect, obtain, request, and consider information such as, for example, the type of payment, the occasion of the payment, the payment triggering party, static input (e.g., the user's input provided to interface dialog engine 211 for setting up the interface, pre-filled information provided by PPG 102 via interface dialog engine 211 and accepted by the user, or rules and regulations relating to the restrictions for sending commercial messages), behavioral inputs (e.g., historical use or receptiveness to some messages), and the like.

In some embodiments, interface design engine 210 may be configured to generate information that is provided in an interface sent to client 114 that includes one or more commercial messages (e.g., promotional offers). Messaging engine 221 may also be configured to determine the content of commercial messages to which a payer or a payee will most likely be responsive. FIGS. 6G and 7B show exemplary interfaces including exemplary commercial messages. To ensure the appropriateness of commercial messages, interface design engine 210 may be configured to interact with messaging engine 221 to determine whether some commercial messages are proper for a particular user or whether the particular user is likely to be responsive to these commercial messages, and display commercial messages via the interface accordingly. Determining whether a user will be receptive to a particular offer may depend on multiple inputs—for example, user-set preferences, historic payment behavior such as having shopped at or ordered from a some store, historic non-payment related information such as having "checked-in" on social media websites at a retail location, membership or loyalty information such as a grocery bonus card membership, whether the user has an electronic gift card for a retailer, or the like. Messaging engine 221 may also be used to communicate with the previously-mentioned social networks and/or a text messaging component, in order to open communication channels with a payee. For example, messaging engine 221 can enable communication with payees that are also linked with the user on Facebook or LinkedIn. Further, messaging engine 221 may also enable communication with payees via text messaging, email messages, phone calls, or the like. One of ordinary skill would understand particular ways of implementing these communication methods/systems. Messaging engine 221 may be configured to perform processes for determining targeted commercial messages for particular users based on, for example, user profile information (e.g., demographics, membership, loyalty information, behavioral data, etc.).

Additionally or alternatively, interface design engine 210 may be configured to generate information that is provided in an interface sent to client 114 that allows a user to exchange information via the interface. For example, interface design engine 210 may be configured to generate information that is provided in an interface sent to client 114 that allows the payer to initiate an information exchange and/or a document exchange (e.g., upload a picture, a card, a poem, a letter, a tweet, a link, etc.). In some other embodiments, interface design engine 210 may be configured to generate information that is provided in an interface sent to client 114 that allows the user to communicate using social networking services.

To keep parties associated with the payment transaction updated with respect to the progress of the payment transaction, interface design engine 210 may be configured to generate information that is provided in an interface sent to client 114 that includes the payment progress status. For example, interface design engine 210 may be configured to interact with payment status engine 223 to obtain information reflecting one or more stages of completion of the payment transaction. Interface design engine 210 may be configured to generate information that is provided in an interface sent to client 114 that includes one or more status messages such as, for example, payment initiated, payment in process, notification received by the payee, route selected, payment reserved, payment completed, payment declined, payment ignored, and the like. Interface design engine 210 may be configured to generate information that is provided in an interface sent to client 114 that includes the status in the form of, for example, a progress bar, text, graphics, etc. In some embodiments, interface design engine 210 may provide detailed feedback with respect to the status of the payment to the parties via the interface. For example, interface design engine 210 may generate information that is provided in an interface sent to client 114 that includes a confirmation message when the payment is completed. In other embodiments, information relating to payment status may be used for fraud control and overall stability of the payment option offered.

Payment network/gateway access engine 225 may enable access to multiple payment networks, Payment networks could include, for example, networks such as those run by credit card companies (PLUS, CIRRUS), independent payment networks (NYCE, STAR), or the like. Payment networks might be accessed directly by the engine or through payment processors or gateways. Gateways and payment processors could include, for example, third party companies such as First Data, FIS, and TSYS. Payment network/gateway access engine 225, in some embodiments, can be configured to allow access to those systems for routing payments and transaction information.

PPG 102 may execute instructions to perform other functions consistent with the disclosed embodiments, Examples of these functions may include the following: Simulation environment—PPG 102 may provide a simulation environment for the user without actually requiring them to engage in a real transaction. The simulation environment may provide most of the described functions consistent with the disclosed embodiments, Gamification—PPG 102 may determine and generate incentives (both virtual and/or real) for rewarding the user for performing some personal payment related activities, such as, for example, opening a new account. The incentives may include earning status such as, for example, a gold/silver/bronze or superstar/starlet/standing rating associated with an account. Real and virtual rewards may also be given for sharing the personal payment experience on social networks and recommending it to other entities or users (e.g., friends, business partners, etc.). Based on information such as, for example, user profiles and prior transaction behavior, this function may include determining whether to grant incentives and the level of incentives to be granted. Minimum data input—PPG 102 may minimize the data the user has to provide, in some embodiments, depending on payment rails and/or routing options chosen by the user, the process may narrow the data request to only the data necessary for the transaction. In other embodiments, by integrating with the user's contact, social network, and the user's phone book, the user may only be required to enter into the amount of payment and one or more of the intended payee's phone number, email address, or name to effect a payment. Additional or alternatively, by integrating historic payment behavior of both the payer and the payee, part of the information may be filled in automatically. Constraint features—PPG 102 may provide mechanisms that allow the user to set her/his preference with respect to constraints to making payments. For example, the user may choose to prevent payments from being made after some time (e.g. 3 a.m.) or to prevent making payments to some payees (e.g. bars). This function may also provide some pre-set limitations or suggested limitations based on multiple inputs, such as, for example, the type of the payment, the location, the time zone of the user, or the like. Crowd sourcing and social sharing—PPG 102 may provide mechanisms that allow the user to share her/his experience relating to making personal payment using disclosed embodiments with other individuals or entities via social networking sites or other broadcast medium. Aggregation of feedback—PPG 102 may provide mechanisms that allow the user to rate, for example, his experience relating to making personal payments, using payment rails, particular routing options, or other functions consistent with the disclosed embodiments. Recurring payment—PPG 102 may provide mechanisms that allow users to make recurring payments. This function may be performed to determine whether the payment is a one-time payment or a recurring payment. Recurring payment may either be a fixed recurring amount (for example, paying rent) or a flexible recurring amount (for example, paying utilities bills), or any other amount (e.g., a fluctuating amount).

Figure 3:
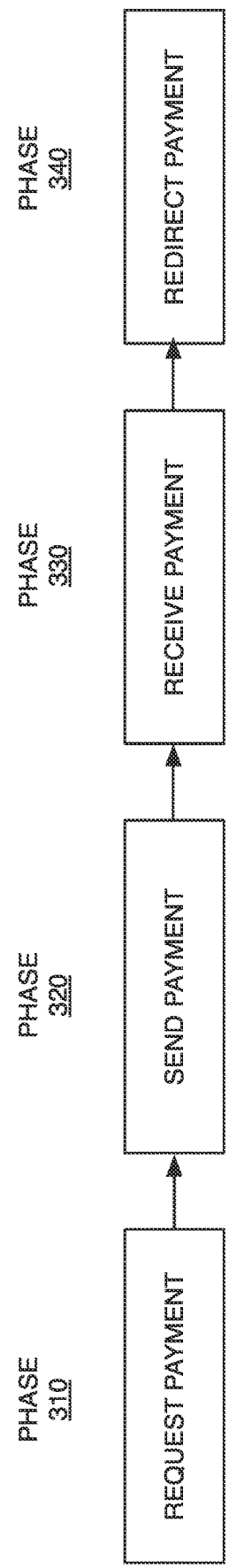
FIG. 3 is an exemplary process flow for effecting payment transactions, in accordance with various embodiments.

FIG. 3 illustrates an exemplary process flow for providing payment transactions consistent with the disclosed embodiments. At step 310, interface design engine 210 may be configured to provide information via an interface that allows a payer, or a payee, or PPG 102 to initiate a payment request (some embodiments are discussed in greater detail at FIGS. 4A-4D). At step 320, interface design engine 210 may be configured to provide information via an interface that allows the payer to send the payment (some embodiments are discussed in greater detail at FIGS. 5A-5E). At step 330, interface design engine 210 may be configured to provide information via an interface that allows the payee to receive the payment (some embodiments are discussed in greater detail at FIGS. 6A-6G). At step 340, interface design engine 210 may be configured to provide information via an interface that facilitates the payee to redirect the received payment (some embodiments are discussed in greater detail at FIGS. 7A and 7B).

Figure 4A:
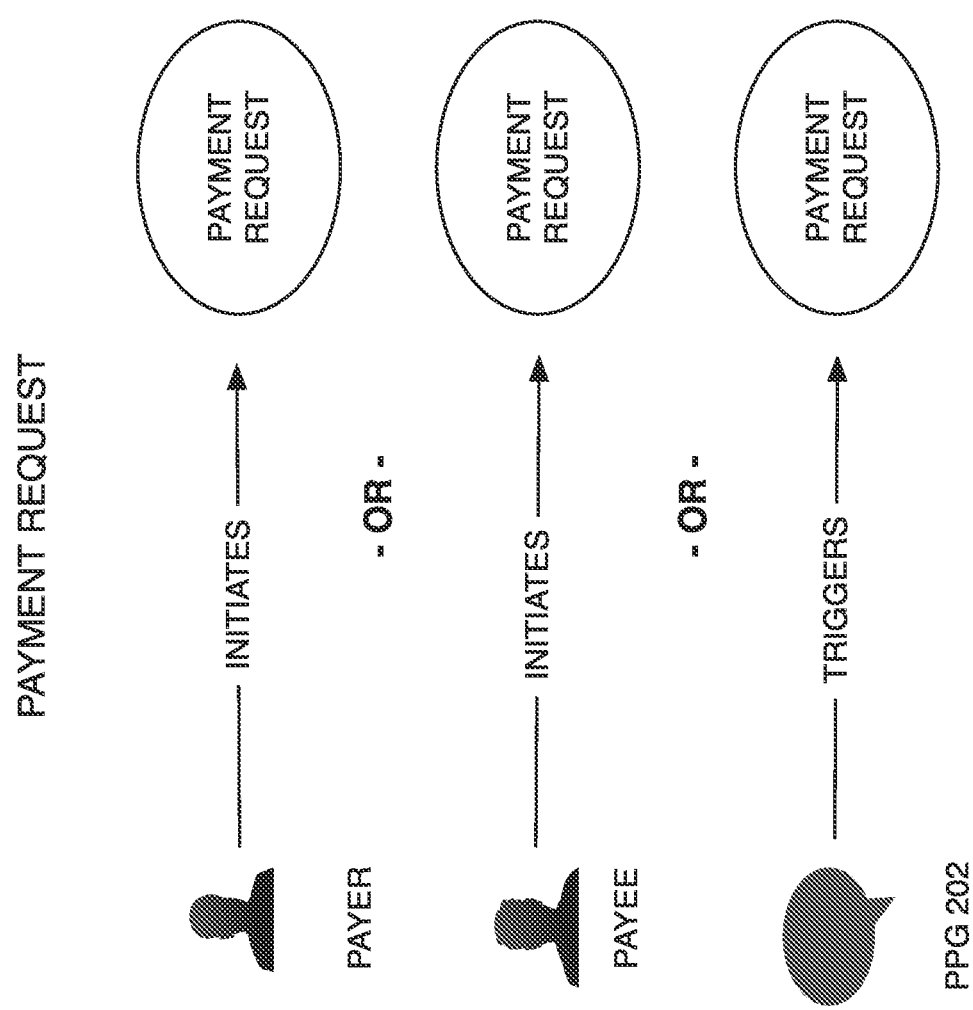
FIG. 4A is an exemplary diagram of payment request processes, in accordance with various embodiments.

As illustrated in FIG. 4A according to some embodiments, interface design engine 210 may be configured to provide mechanisms via an interface sent to client 114 that allow various parties to initiate payment requests, such as a payer, payee, or PPG 102.

Figure 4C:
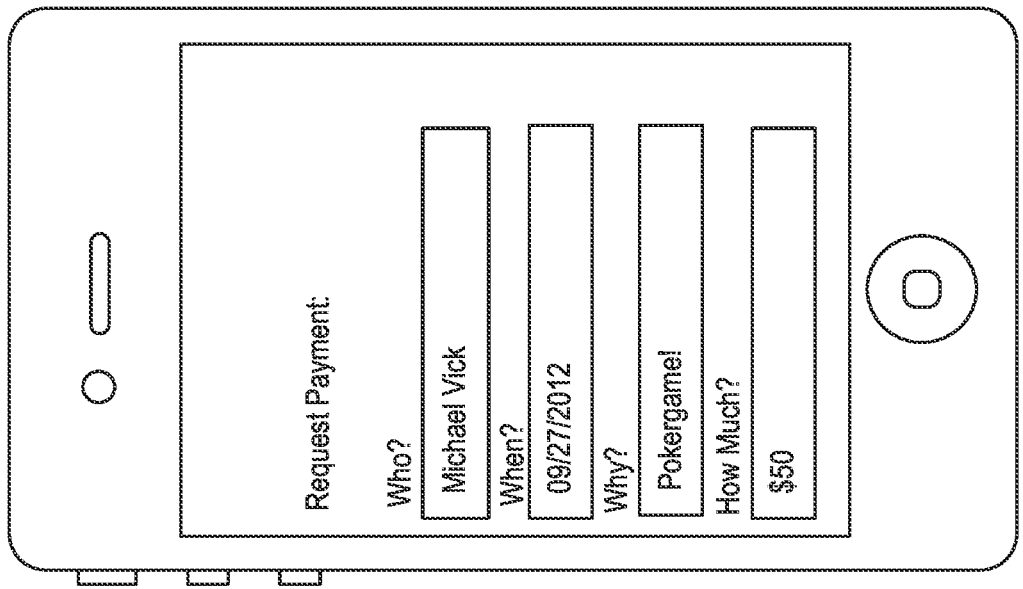
FIG. 4C is a screenshot of an exemplary payee payment request interface, in accordance with various embodiments.
Figure 4B:
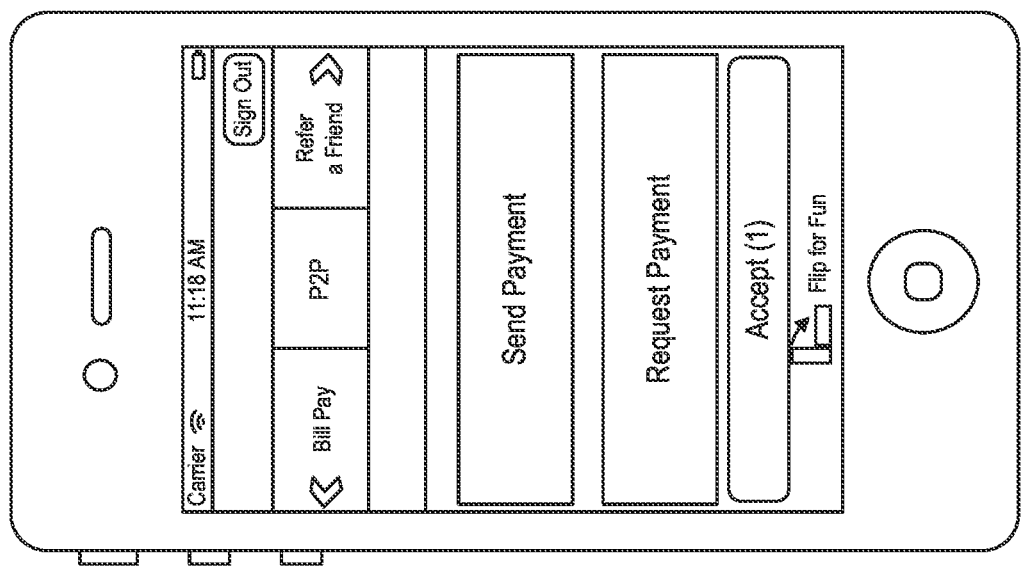
FIG. 4B is a screenshot of exemplary payer payment request interface, in accordance with various embodiments.

As shown in FIG. 4B according to some embodiments, interface design engine 210 may be configured to generate information that is provided in an interface sent to client 114 that allows the payer to initiate a payment request by logging in the system of PPG 102 and choosing the option of request payment. In one aspect, the payer may initiate the payment request from a website associated with financial service provider 110. Alternatively, the payer may initiate the payment request through a mobile application provided by or associated with PPG 102 that is downloaded on client 114 (e.g., a smartphone or a tablet).

As shown in FIG. 4C accordingly to some embodiments, interface design engine 210 may be configured to generate information that is provided in an interface sent to client 114 that allows the payee to initiate a payment request. For example, the payee may request the payment by logging into PPG 102 (e.g., via portal, website, or other online or networked system) and provide information such as, for example, the payer's name, date of request, payment amount, and reason for requesting this payment, and the like. In one aspect, the payee may initiate the payment request from the website of financial service provider 110. Alternatively, the payee may initiate the payment request by using a mobile application provided by, or associated with, PPG 102 that may be downloaded on client 114.

Figure 4D:
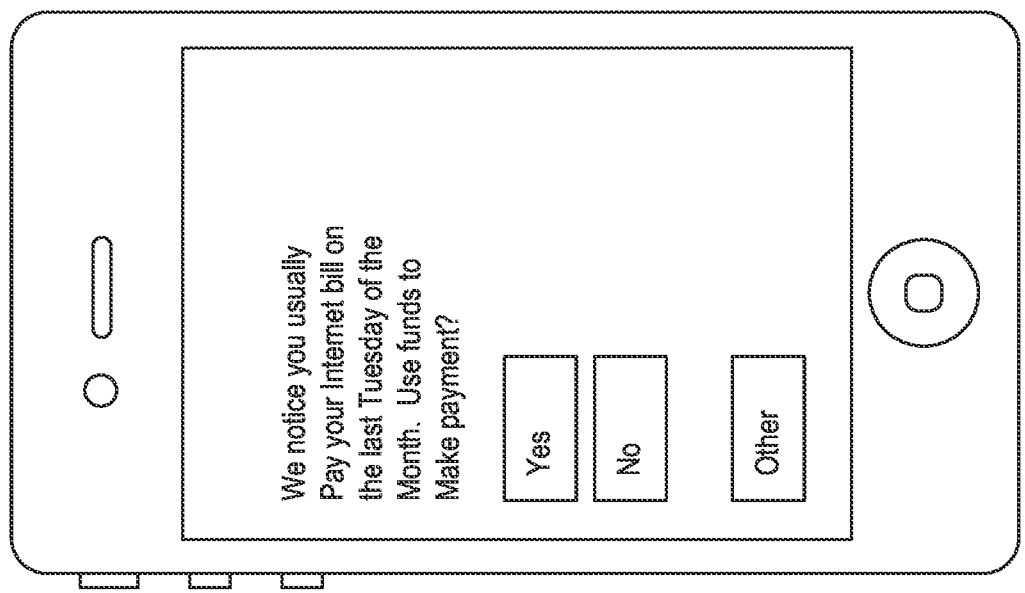
FIG. 4D is a screenshot of an exemplary payment request trigger interface, in accordance with various embodiments.

As shown in FIG. 4D according to some embodiments, interface design engine 210 may be configured to display payment reminders or suggestions (e.g., time to pay a bill) via an interface. In some embodiments, interface design engine 210 may be configured to generate information that is provided in an interface sent to client 114 that includes one or more reminders or suggestions generated by PPG 102. PPG 102 may execute instructions to perform functions related to obtaining information from, for example, calendars, payment history, social networking sites, billers, retailers, merchants, utility companies, etc. to identify one or more events that might warrant a payment. Based on this information, PPG 102 may determine whether to execute instructions to trigger interface design engine 210 to generate information that is provided in an interface sent to client 114 that includes such reminders or suggestions. For example, a social networking site (e.g., Facebook®) associated with a user may include information that indicates a relative of the user has an approaching birthday. PPG 102 may be configured to collect this information. Based on that information, interface design engine 210 may generate information that is provided in an interface sent to client 114 that includes a suggestion to the user to send a gift card or other type of payment to the relative as a birthday gift. Other types of suggestions and sources for those suggestions may be implemented consistent with the disclosed embodiments.

Figure 5A:
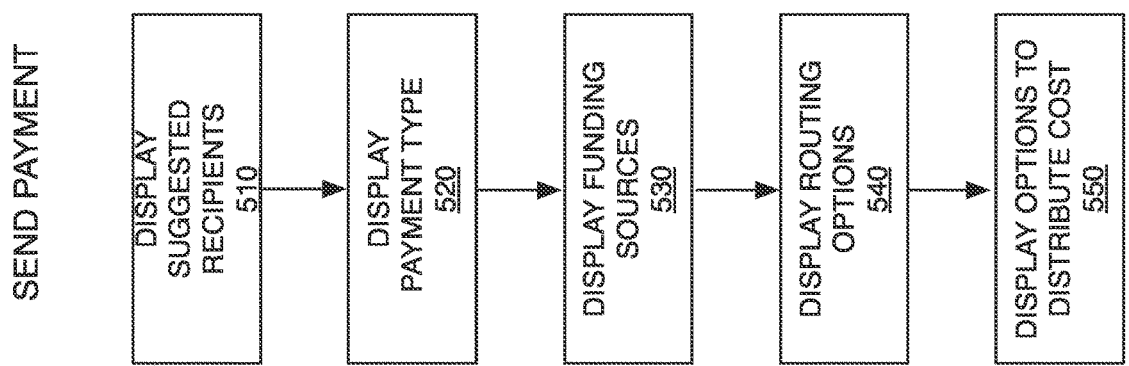
FIG. 5A is an exemplary process flow for sending payment, in accordance with various embodiments.

FIG. 5A shows a process flow for sending payment consistent with disclosed embodiments. In one aspect, interface design engine 210 may be configured to generate information that is provided in one or more interfaces sent to client 114 associated with the processes of FIG. 5A. For example, to facilitate the payer to send the payment in a flexible and convenient way, interface design engine 210 may be configured to perform functions including, for example, generating information that is provided in an interface sent to client 114 that includes suggested payees based on input from the payer (step 510). Interface design engine 210 may also generate information that is provided in an interface sent to client 114 that includes a suggested payment type (step 520). Interface design engine 210 may also generate information that is provided in an interface sent to client 114 that includes one or more suggested funding sources to fund the payment (step 530). In another aspect, interface design engine 210 may generate information that is provided in an interface sent to client 114 that includes one or more suggested routing sources to rail the payment (step 540). Interface design engine 210 may also generate information that is provided in an interface sent to client 114 that includes one or more options to distribute cost associated with some routing options (step 550).

In some embodiments, interface design engine 210 may be configured to provide an interface that requests minimum input from a user for sending the payment from the payer (e.g., step 510). For example, as shown in FIG. 5B according to some embodiments, interface design engine 210 may generate information that is provided in an interface sent to client 114 that allows the payer to provide one or more pieces information related to an intended payee (e.g., only provide the intended payee's name "Calvin Johns"). In some embodiments, requested information may include, for example, name, e-mail address, physical address, etc. In other embodiments, interface design engine 210 may be configured to generate information that is provided in an interface sent to client 114 that allows the payer to input the information of the payee by ways including, for example, voice input, tying, token, and/or shortlisted entry.

Based on the information provided by the payer, as shown in FIG. 5B according to some embodiments, interface design engine 210 may generate information that is provided in an interface sent to client 114 that includes one or more suggested recipients (e.g., Calvin Johnsons from Detroit and Calvin Johnsons from Seattle) by interacting with payee identity engine 213 (some embodiments were discussed in greater detail above). To better assist the payer to select the intended payee, interface design engine 210 may generate information that is provided in an interface sent to client 114 that includes additional identification information of the suggested recipients including, for example, a level of confidence with respect to the likelihood of each of the provided candidate payee(s) being the intended payee (e.g., likelihood score reflected in a color bar), pictures, addresses (e.g., Detroit, MI and Seattle, WA), phone numbers (e.g., 867-5309), data sources used for identifying the suggested recipients (e.g., Site A (may be Facebook) and Site B (may be LinkedIn)), and other confirmatory data (e.g., age and Nickname). Additionally or alternatively, if the intended payee is not included in the suggested recipients, interface design engine 210 may be configured to generate information that is provided in an interface sent to client 114 that allows the payer to provide feedback (e.g., option of "none of these") that is used by PPG 102 for providing other options to identify a payee.

In some embodiments, interface design engine 210 may be configured to generate information that is provided in an interface sent to client 114 that allows the payer to select a payment type (e.g., step 520). For example, as shown in FIG. 5C, according to some embodiments, interface design engine 210 may generate an interface that provides alternative payment types if it determines that the payer initially chose to send the payment by cash and enters into the amount of money he/she wanted to transfer (e.g., $100) (e.g., "Optional: Would you like to send Calvin a gift instead?"). As shown in FIG. 5C according to some embodiments, based on the information about the intended payee and the payment type (e.g., Calvin and gift card), PPG 102 may execute instructions to determine whether the payment is for a particular purpose, such as, the intended payee's birthday, and may cause interface design engine 210 to display this particular purpose (e.g., "Is this for Calvin's birthday?") for the payer to confirm. If the particular purpose is confirmed, interface design engine 210 may be configured to perform other functions via the interface consistent with the disclosed embodiments, such as, for example, allow the payer to send a birthday card or upload a picture or a video together with the payment.

In some embodiments, interface design engine 210 may be configured to generate information that is provided in an interface sent to client 114 that allows the payer to choose a funding source to fund his/her payment (e.g., step 530). For example, the payer may choose to fund the payment from the user's saving account, checking account, credit card, or the like. In some embodiments, the suggested funding source displayed via the interface may be the payer's preferred funding source, as determined by funding source engine 215 (some embodiments were discussed in greater detail above).

Figure 5D:
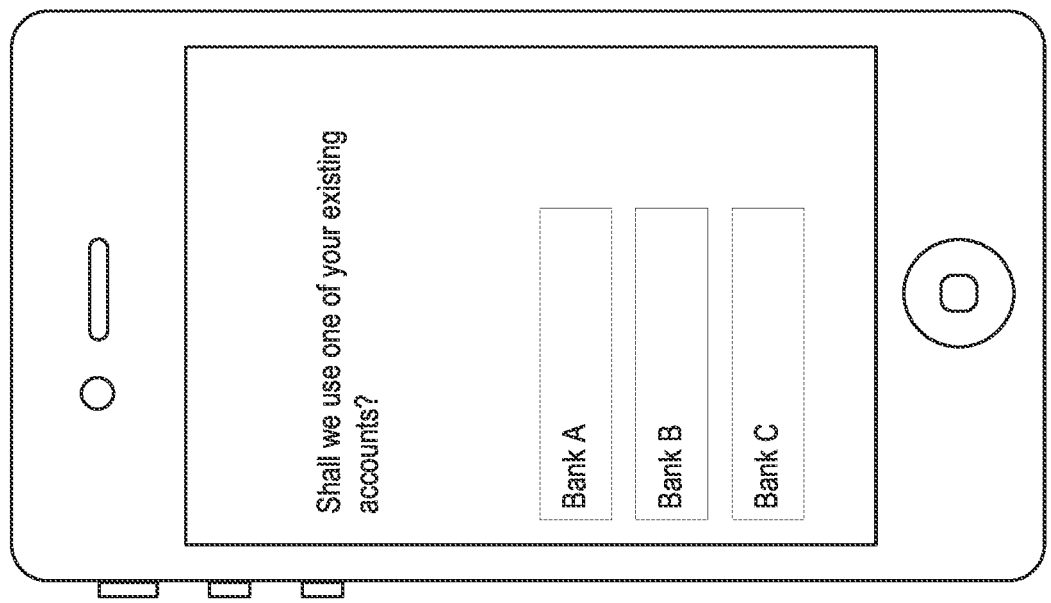
FIG. 5D is a screenshot of an exemplary payment routing option interface, in accordance with various embodiments.

In some embodiments, interface design engine 210 may be configured to generate information that is provided in an interface sent to client 114 that includes one or more routing options for the payer to choose (e.g., step 540). For example, as shown in FIG. 5D according to some embodiments, interface design engine 210 may generate information that is provided in an interface sent to client 114 that includes a routing option to rail the payer's payment via the interface (e.g., Bank A (may be clover) or Bank B (may be PayPal) or Bank C (may be Venmo)). In some embodiments, the routing options shown via the interface may be ones preferred by the payer, as determined by routing option engine 217, as described above. In some embodiments, interface design engine 210 may be configured to generate information that is provided in an interface sent to client 114 that allows the payer to limit, expand, or recommend some routing options to be displayed to the payee. In other embodiments, interface design engine 210 may be configured to generate information that is provided in an interface sent to client 114 that includes one or more routing options that the payee is currently signed up for or aligned with.

Figure 5E:
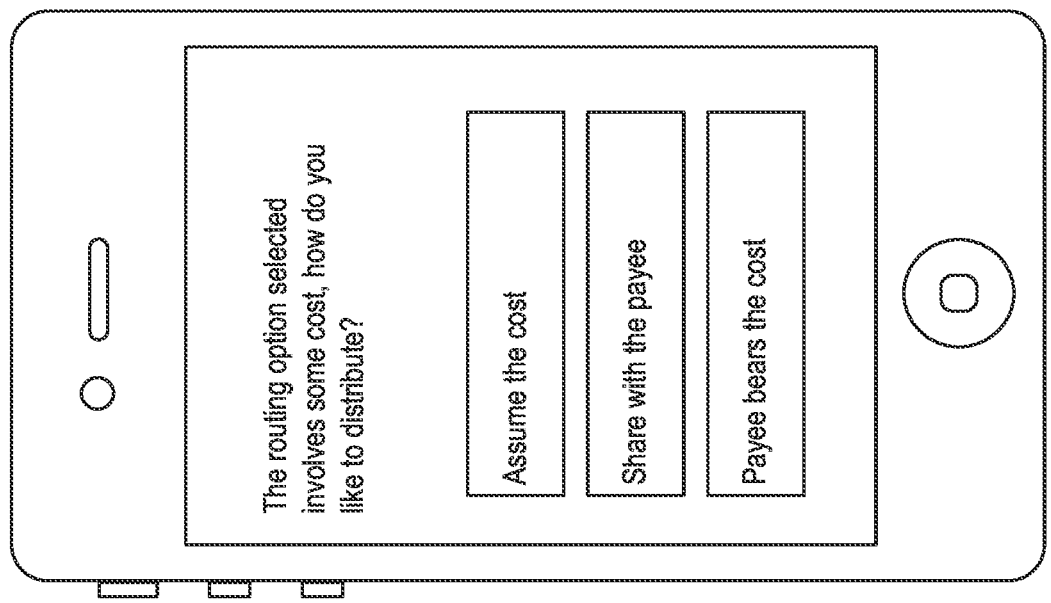
FIG. 5E is a screenshot of an exemplary distributing cost interface associated with a selected routing option, in accordance with various embodiments.

In some embodiments, some routing options may involve some cost. Interface design engine 210 may be configured to generate information that is provided in an interface sent to client 114 that includes option(s) for the payer to distribute the cost associated with the selected routing option (e.g., step 550). For example, as shown in FIG. 5E according to some embodiments, interface design engine 210 may generate information that is provided in an interface sent to client 114 that allows the payer may choose, via the interface, to bear the cost on his/her own, share the cost with the payee, or choose to have the payee to bear the cost.

Figure 6A:
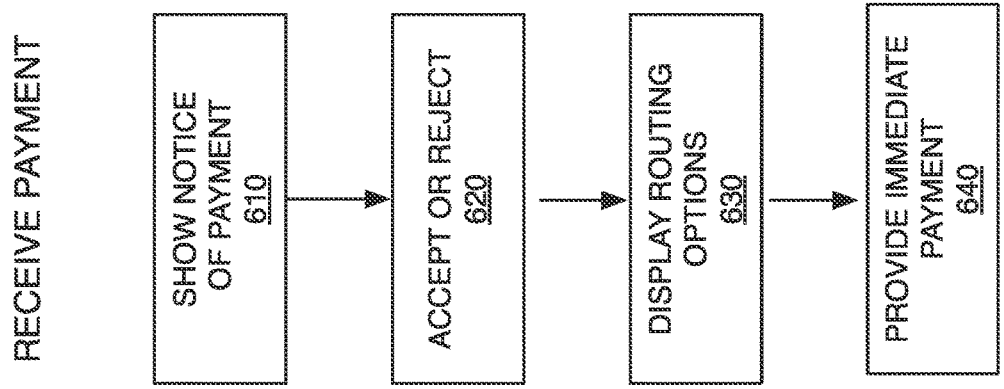
FIG. 6A is an exemplary process flow for receiving payment, in accordance with various embodiments.

FIG. 6A shows a process flow for receiving payment consistent with disclosed embodiments. As illustrated in FIG. 6A according to some embodiments, interface design engine 210 may be configured to generate information that is provided in an interface sent to client 114 that provides guidance to the payee for receiving the payment. To assist the payee in receiving the payment in a flexible and timely manner, interface design engine 210 may be configured to perform functions including, for example, generating information that is provided in an interface sent to client 114 that shows a notice of incoming payment to the payee via the interface (e.g., step 610). Interface design engine 210 may also generate information that is provided in an interface sent to client 114 that provides the payee with an option to reject or accept the payment (e.g., step 620). Interface design engine 210 may also generate information that is provided in an interface sent to client 114 that includes one or more routing options to receive the payment (e.g., step 630). Interface design engine 210 may also generate information that is provided in an interface sent to client 114 that includes an option for receiving the payment immediately (e.g., step 640).

Figure 6B:
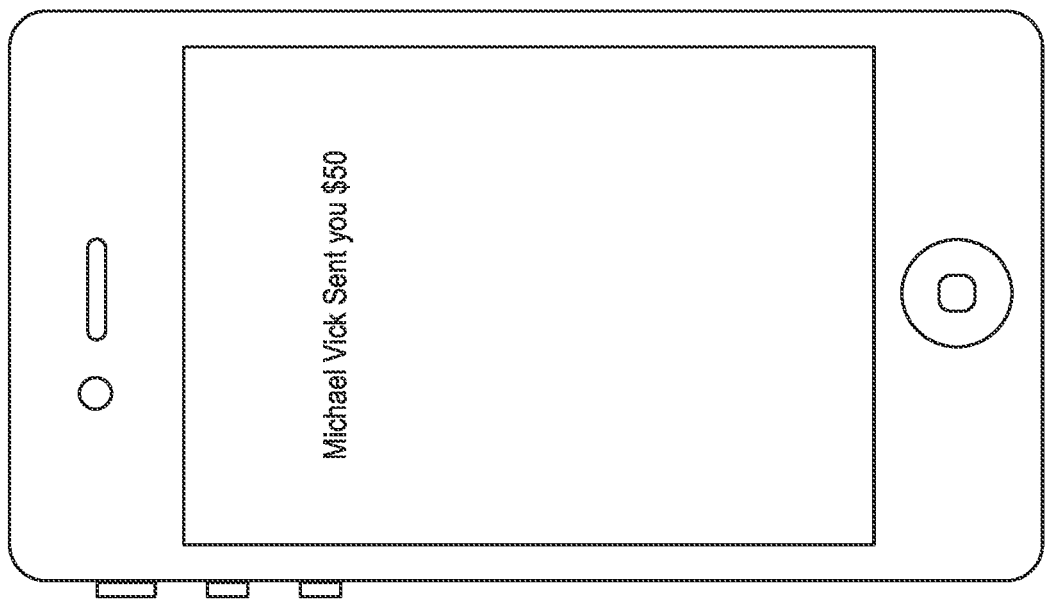
FIG. 6B is a screenshot of an exemplary interface providing a notice informing a payee of an incoming payment, in accordance with various embodiments.

As shown in FIG. 6B according to some embodiments, interface design engine 210 may be configured to generate information that is provided in an interface sent to client 114 that provides a notice to the payee informing the payee of the incoming payment via the interface (e.g., "Michael Vick Sent you $50") (e.g., step 610). The notice may contain information including, for example, the payer, the amount of payment, the reason of the payment, and other information relating to the payment.

Figure 6C:
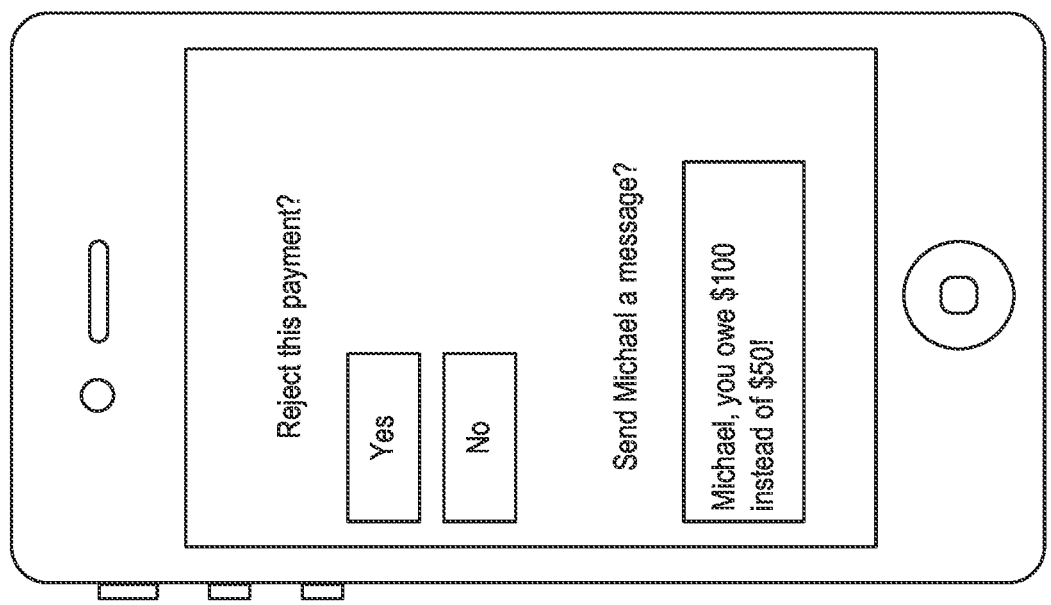
FIG. 6C is a screenshot of an exemplary interface providing a payee with an option to reject or accept an incoming payment, in accordance with various embodiments.

As shown in FIG. 6C according to some embodiments, interface design engine 210 may be configured to generate information that is provided in an interface sent to client 114 that provides the payee with an option of either accepting or rejecting the incoming payment (e.g., step 620). In some embodiments, as shown in FIG. 6C, interface design engine 210 may be configured to generate information that is provided in an interface sent to client 114 that allows the payee to provide reasons for rejecting the incoming payment, which may include, for example, the payment amount is incorrect, the payee is not the intended payee, or the like. Additionally or alternatively, interface design engine 210 may be configured to generate information that is provided in an interface sent to client 114 that allows the payee to amend the payment by requesting the payer to pay for costs associated with the payment transaction (e.g., paying for paper check costs).

Figure 6D:
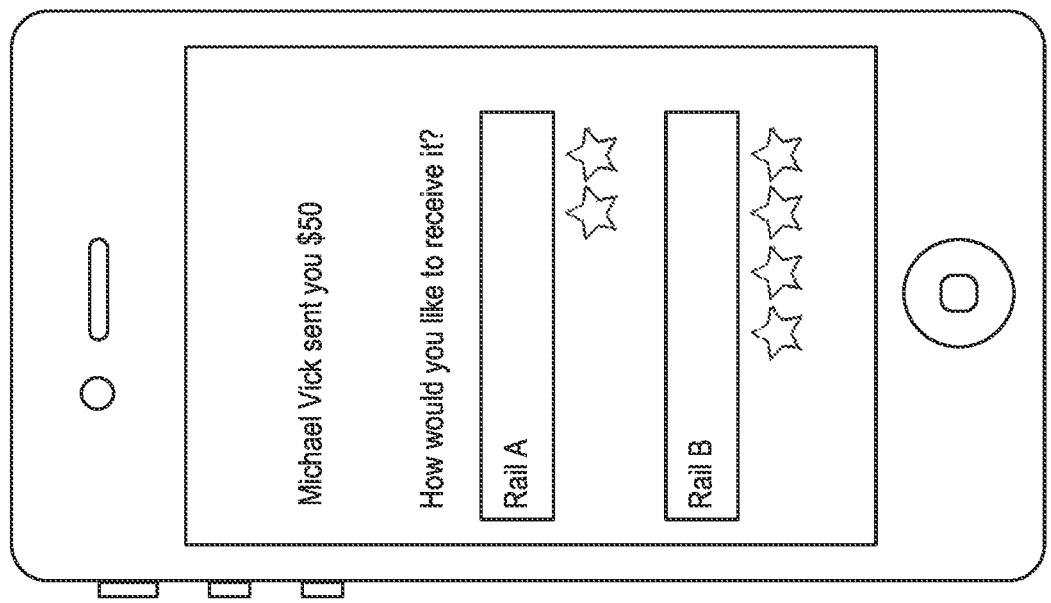
FIG. 6D is a screenshot of an exemplary interface suggesting routing options of receiving a payment, in accordance with various embodiments.
Figure 6E:
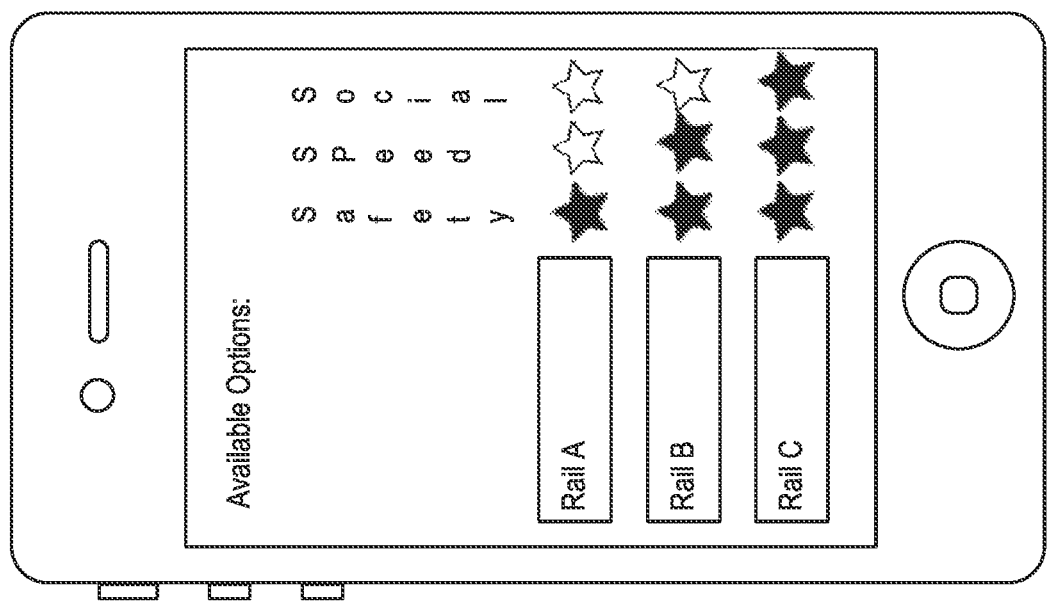
FIG. 6E is a screenshot of an exemplary interface for suggesting routing options with associated rankings, in accordance with various embodiments.

Once the payee accepts the payment, interface design engine 210 may be configured to generate information that is provided in an interface sent to client 114 that includes one or more routing options for the payee to receive the payment (e.g., step 630). In some embodiments, interface design engine 210 may be configured to obtain suggested routing options and their rankings by interacting with routing option engine 217 of PPG 102 (some embodiments were discussed in greater detail above). As shown in FIG. 6D according to some embodiments, interface design engine 210 may be configured to generate information that is provided in an interface sent to client 114 that includes one or more suggested routing options (e.g., Rail A (may be PayPal) and Rail B (may be Electric Orange)) and their associated rankings (e.g., as reflected by a number of stars). Other types of graphics or content may be used to reflect associated rankings (e.g., bars, numbers, text, etc.). As shown in FIG. 6E according to some embodiments, interface design engine 210 may be configured to generate information that is provided in an interface sent to client 114 that includes one or more parameters for each of the rankings (e.g. safety, speed, social). The parameters displayed via the interface may include, for example, safety, speed, cost, stability, customer experience, crowed sourced rankings, etc.

Figure 6F:
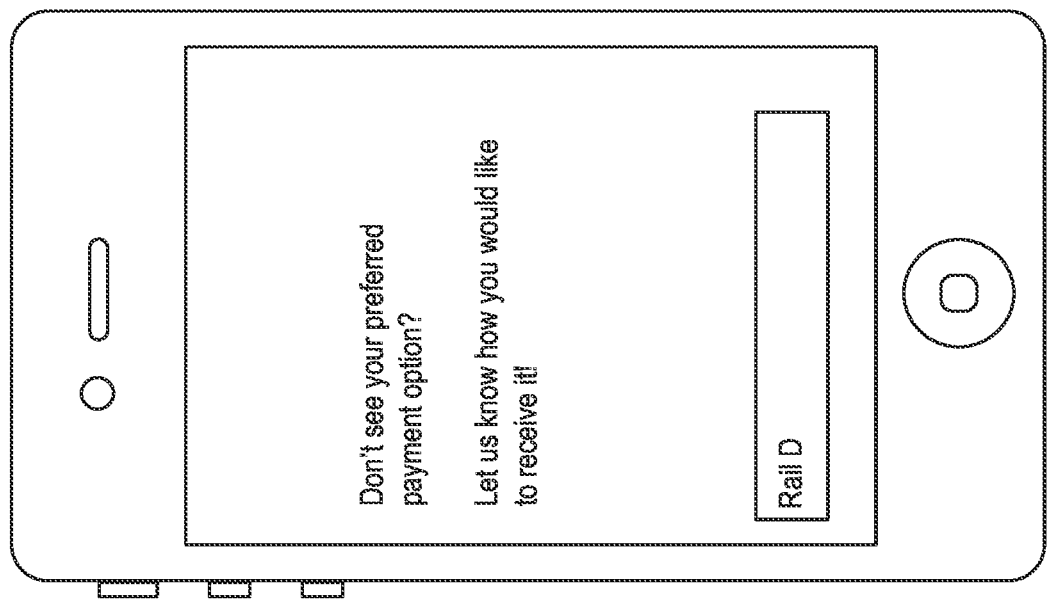
FIG. 6F is a screenshot of an exemplary interface for a payee to input a routing option, in accordance with various embodiments.
Figure 6G:
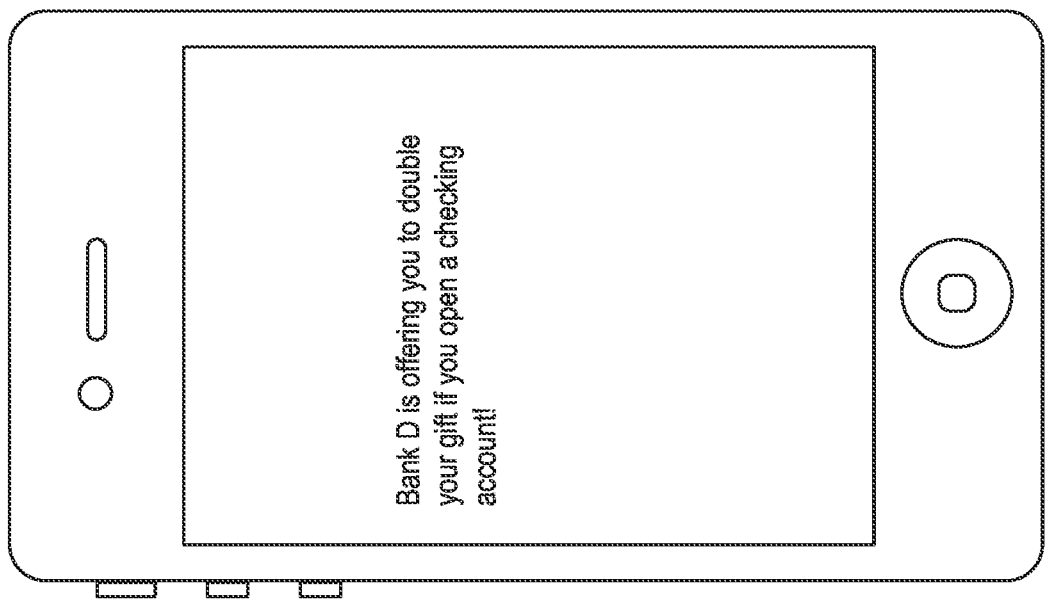
FIG. 6G is a screenshot of an exemplary interface providing a commercial message, in accordance with various embodiments.

Additionally or alternatively, as shown in FIG. 6F according to some embodiments, if the payee's preferred routing option is not listed in the suggested routing options, interface design engine 210 may be configured to generate information that is provided in an interface sent to client 114 that allows the payee to enter the payee's preferred routing option (e.g., Rail D (may be Greendot)).

Additionally or alternatively, to better assist the payee to select a routing option, interface design engine 210 may be configured to generate information that is provided in an interface sent to client 114 that includes one or more alternative options and display incentives associated with choosing a suggested alternative option. As shown in FIG. 6G according to some embodiments, interface design engine 210 may be configured to generate information that is provided in an interface sent to client 114 that includes one or more commercial messages to the payee associated with selecting routing options (e.g., "open a checking account"). Moreover, interface design engine 210 may also generate information that is provided in an interface sent to client 114 that includes one or more incentives for the user upon choosing a suggested routing option (e.g., "Bank D is offering you to double your gift if you open a checking account").

Depending on the selected routing option, the payee may not immediately receive the funds associated with a payment. For example, if the payer deposits some money directly into the payee's bank account, the payee may not withdraw or use the payment immediately. In some embodiments, interface design engine 210 may be configured to generate information that is provided in an interface sent to client 114 that allows the payee to apply for credit advance (e.g., step 640 shown in FIG. 6A).

As shown in FIG. 7A according to some embodiments, interface design engine 210 may be configured to generate information that is provided in an interface sent to client 114 that includes one or more allocation options for the payee to redirect his/her received payment. In these examples, the payee may act as the payer. Examples of the allocation options to redirect the payment may include, for example, putting a received payment towards bills of the payee, purchasing groceries at a store, buying a pastry or a candy bar at a store close to the payee for himself/herself or for other parties, or purchasing items at online retailers that the payee has selected on the retailer's website or that the payee previously placed on a "wish list." Additionally or alternatively, as shown in FIG. 7B according to some embodiments, interface design engine 210 may be configured to generate information that is provided in an interface sent to client 114 that includes one or more promotional offers that incentivize the payee to allocate his/her received payment in a some way (e.g. promotional offers from Retailer A and Retailer B).

Interface design engine 210 may be configured to perform other functions consistent with the disclosed embodiments. For example, to assist the user in making an informed decision associated with payment transaction (e.g., selecting payment rails, communication channels, or allocation options), interface design engine 210 may be configured to generate information that is provided in an interface sent to client 114 that includes a simulation environment to the user without actually requiring them to engage in a real transaction. The simulation environment may provide most of the described functions consistent with the disclosed embodiments. For example, at each step associated with the payment transaction, interface design engine 210 may be configured to provide information via an interface sent to client 114 that includes an assessment of the effort required for completing that step, and/or the degree of complexity involved. In the simulation environment, the user may familiarize himself/herself with the processes performed by PPG 102 without actually effecting the payment transaction.

Figure 8:
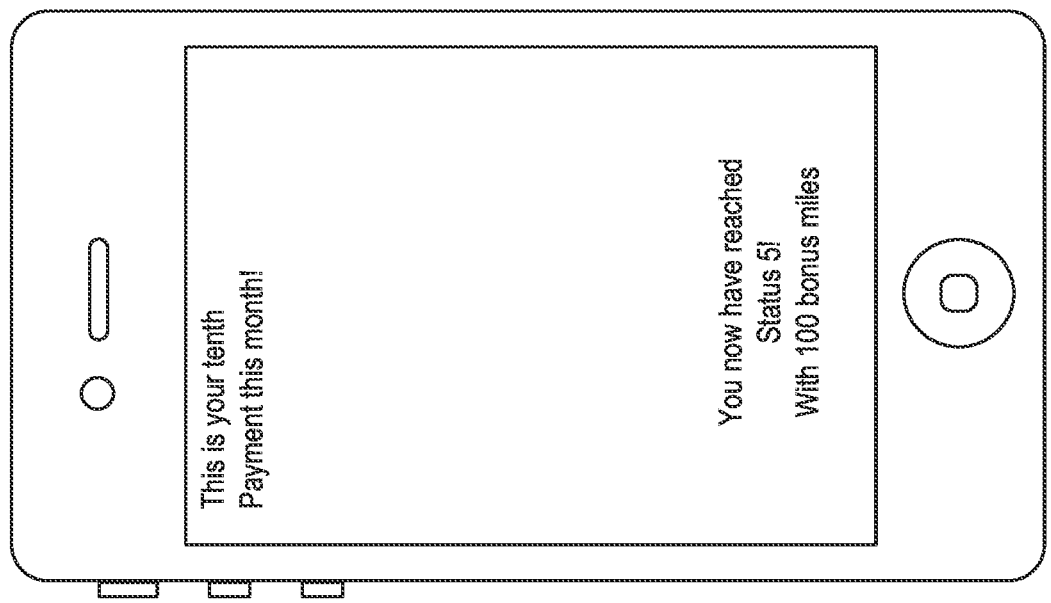
FIG. 8 is a screenshot of an exemplary interface providing user incentives, in accordance with various embodiments.

As another example, as shown in FIG. 8, interface design engine 210 may be configured to generate information that is provided in an interface sent to client 114 that includes one or more incentives (both virtual and/or real) for rewarding the user for performing some personal payment related activities, such as, for example, making some times of payment using PPG 102, opening a new account with financial service provider 110, and the like. The incentives displayed via the interface may include earning status such as, for example, a gold/silver/bronze or superstar/starlet/ standing rating associated with an account.

Figure 9A:
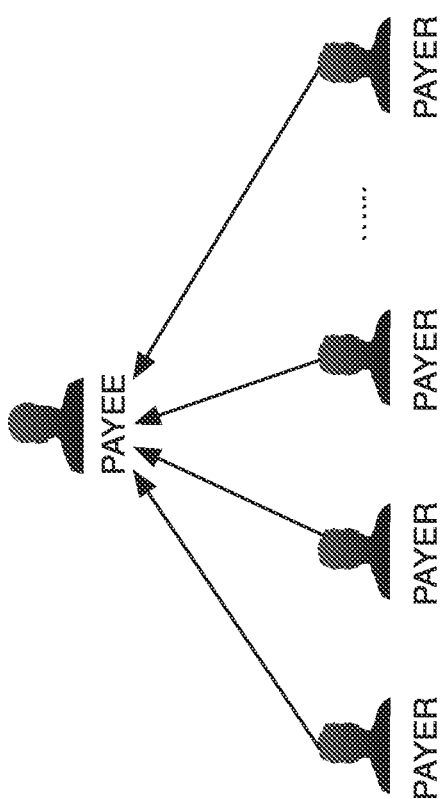
FIG. 9A is an exemplary group payment scenario, in accordance with various embodiments.
Figure 9B:
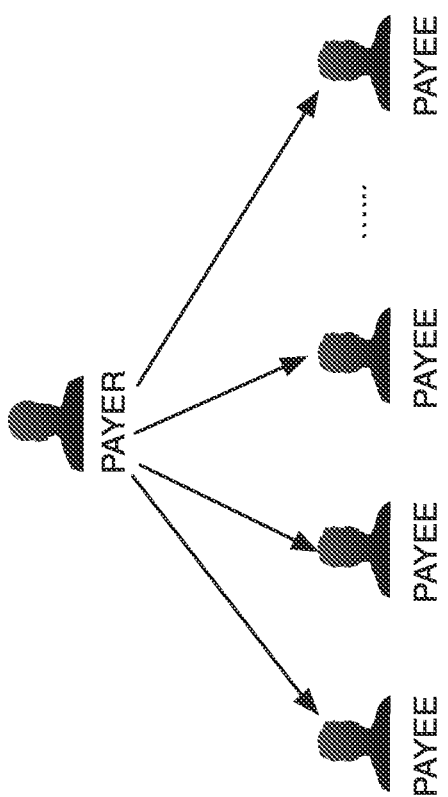
FIG. 9B is an exemplary group payment scenario, in accordance with various embodiments.
Figure 9C:
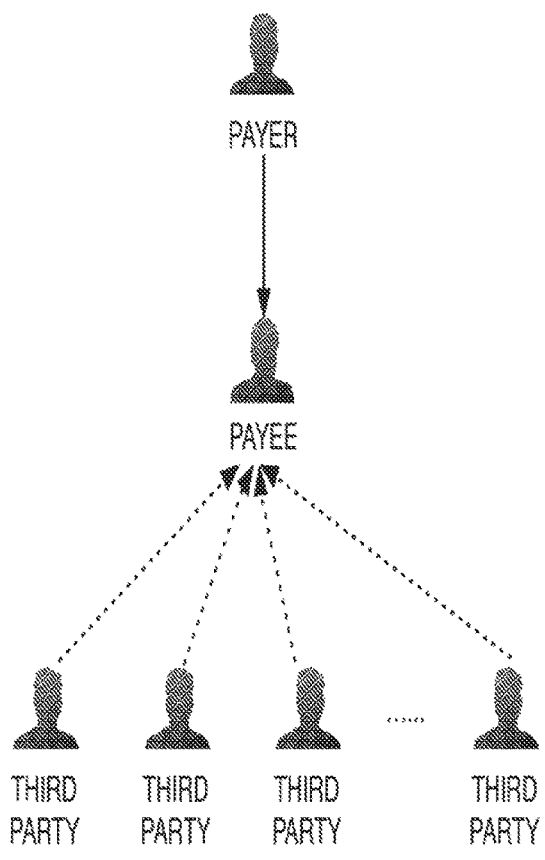
FIG. 9C is an exemplary group payment scenario, in accordance with various embodiments.
Figure 9D:
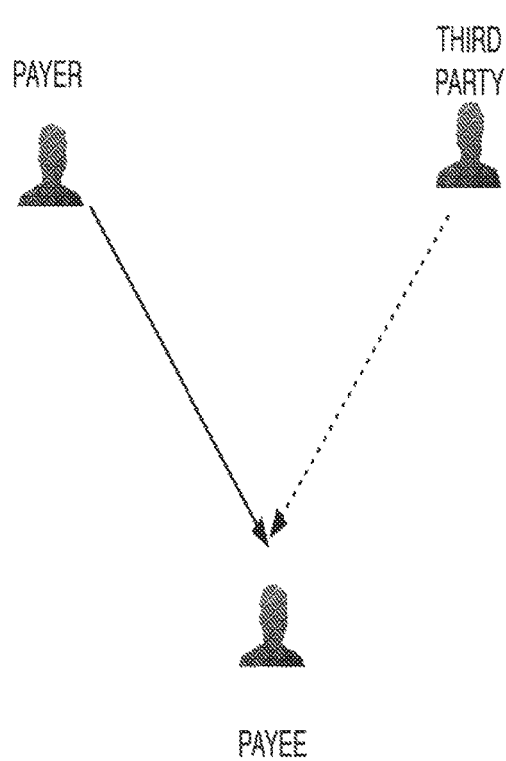
FIG. 9D is an exemplary third party payment scenario, in accordance with various embodiments.

In some embodiments, interface design engine 210 may be configured to generate information that is provided in an interface sent to client 114 that allows users to make multiple-party payment transactions. FIG. 9A shows an exemplary scenario involving multiple payers providing payment to a single payee, consistent with some embodiments. Additionally or alternatively, FIG. 9B shows an exemplary scenario involving a payer making payments to multiple payees, consistent with some embodiments. Additionally or alternatively, FIG. 9C shows an exemplary scenario involving a payer making a payment to a single payee on behalf of multiple third parties, consistent with some embodiments. In other embodiments, as shown in FIG. 9D, disclosed embodiments may allow a payer to provide payments to multiple payees.

Figure 9E:
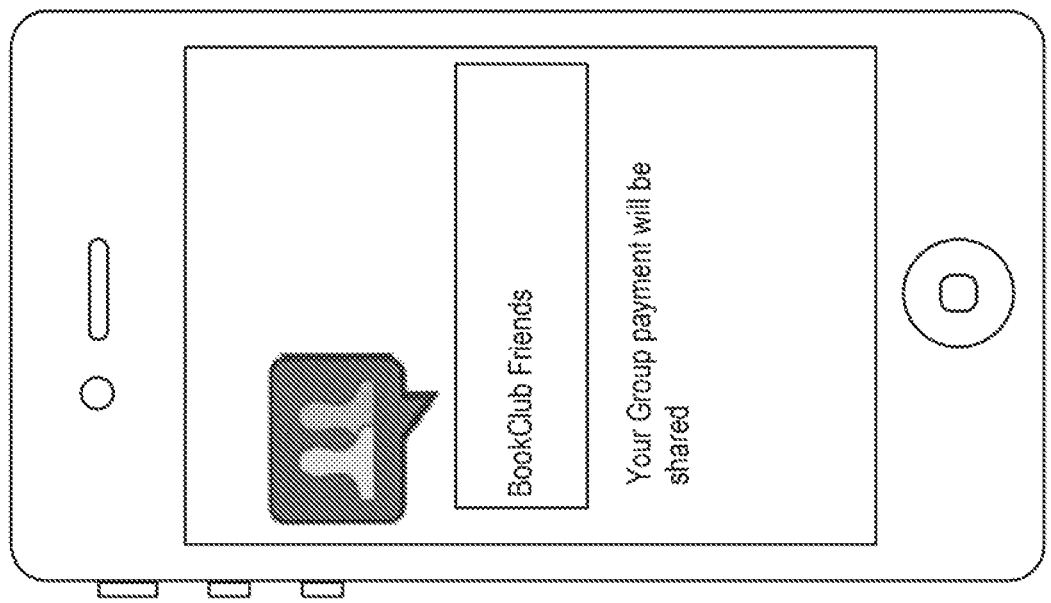
FIG. 9E is a screenshot of an exemplary interface for sharing group payment information, in accordance with various embodiments.

In other embodiments, the user may share his/her payment request with a group of users. Interface design engine 210 may generate information that is provided in an interface sent to client 114 that includes information relating to such a group payment, as shown for example in FIG. 9E. In other embodiments, interface design engine 210 may be configured to generate information that is provided in an interface sent to client 114 that allows a user to collect money from one or more parties. For example, the user may raise funds for a charity, or the user may run an office pool to raise funds for various purposes. In these situations, interface design engine 210 may be configured to generate information that is provided in an interface sent to client 114 that includes videos, pictures, logos, website link, group discussions, and/or other information relating to the purposes of raising funds.

Figure 10:
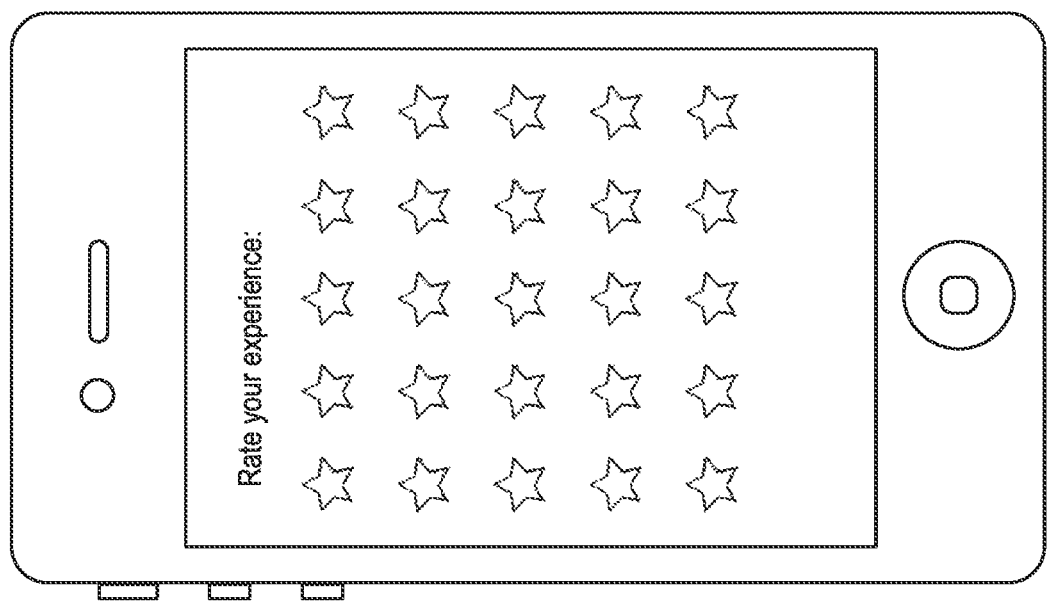
FIG. 10 is a screenshot of an exemplary interface for rating a user's experience, in accordance with various embodiments.

As another example, as shown in FIG. 10, interface design engine 210 may be configured to generate information that is provided in an interface sent to client 114 that allows the user to rate his/her experience relating to making personal payment using one or more processes consistent with the disclosed embodiments. In some embodiments, interface design engine 210 may be configured to generate information that is provided in an interface sent to client 114 that allows the user to share his/her experiences via the interface using social networking sites or other broadcast media.

Interface design engine 210 may also be configured to generate information that is provided in an interface sent to client 114 that allows the user to set one or more constraints relating to a payment transaction. For example, interface design engine 210 may generate information that is provided in an interface sent to client 114 that allows the user to set a maximum number of individual transfer amounts, preferred pre-fill of fields, maximum time period amounts, restricted recipients, restricted routing options, locale and time of the payment, and/or the like.

Figure 11:
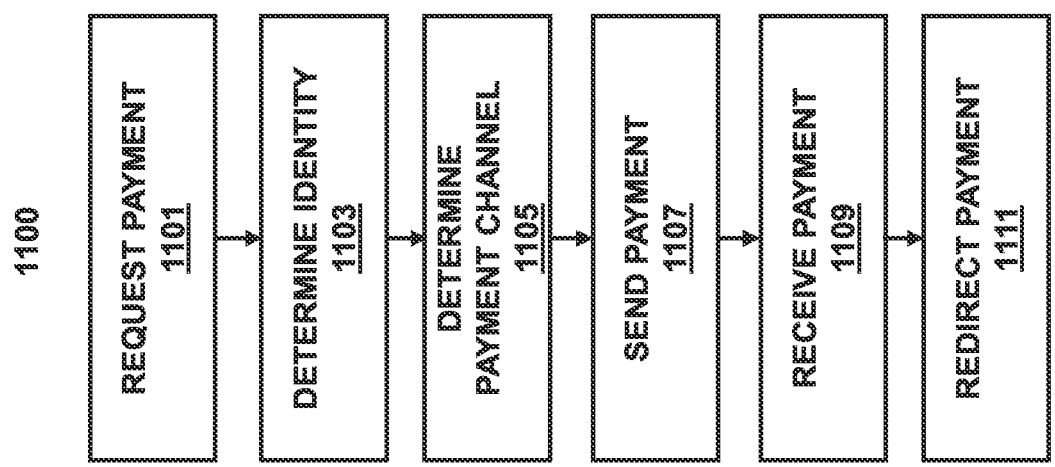
FIG. 11 is an exemplary process flow for effecting a payment transaction, in accordance with various embodiments.

FIG. 11 illustrates a general overview of an exemplary process flow 1100 of PPG 102 that may be performed by the disclosed embodiments. Blocks 1101-1111 represent multiple steps in an exemplary process of effecting a payment transaction.

At step 1101, PPG 102 may execute instructions to provide mechanisms that allow a payer, or a payee, or PPG 102 to initiate a payment transaction. In some embodiments, a payer may initiate a payment request. The payer may initiate the payment request from the website of financial service provider 110. Alternatively, the payer may initiate the payment request by using the application of PPG 102 downloaded into his/her computing device—for example, a smartphone or a tablet.

In some embodiments, the payee may initiate the payment request. For example, the payee may request the payment by providing information such as, for example, the payer's name, date of request, payment amount, and reason for requesting this payment. The payee may initiate the payment request from the website of financial service provider 110. Alternatively, the payee may initiate the payment request by using the application of PPG 102 downloaded into his/her computing device, preferably, a smartphone or a tablet. To process the payment transaction initiated by the payee, PPG 102 may execute instructions to perform some embodiments of the functions consistent with the disclosed embodiments for processing the payment transactions initiated by the payer. For example, payee identity engine 213 may be configured to suggest intended payers to the payee based on the payer's name provided by the payee. Routing option engine 217 may be configured to allow the payee to choose a payment rail that the payer is likely to accept. Moreover, messaging engine 221 may be configured to provide mechanisms that allow the payee to initiate parallel messages with the payer and exchange documents with the payer.

In some embodiments, PPG 102 may execute instructions to trigger a payment. For example, PPG 102 may have engines/modules that may be configured to send a reminder or a suggestion for a new payment to a payer. In some embodiments, these engines/modules may be configured to obtain information from, for example, calendars, payment history, and social networking sites, or the like to identify relevant events that might warrant a payment, and determine whether to send reminders or suggestions. For example, these engines/modules may determine through a social networking site (e.g., Facebook) that a relative of the payer has an approaching birthday, and based on this determination, a suggestion may be given to the payer to send a gift card or other type of payment to the relative as a birthday gift.

At step 1103, the recipient's identity may be determined. Using, for example, payee identity engine 213, disclosed embodiments can utilize a system to determine the correct recipient of funds. As mentioned earlier, social networks, public identity databases, or personal data stores can be accessed to determine, based on the entry of some information (e.g., a first name, a last name, an address, or some other input), the proper recipient of the funds to be paid in this transaction.

When attempting to identify the recipient, step 1103 can also include functionality to determine and list the number and relevancy of possible "hits" (i.e., search results) for possible recipients. This, in turn, enables the user and/or the user's device to choose a possible recipient. The relevancy may be a measure of ranking—for example, if payee identity engine 213 determines that the user has had previous interactions with a specific payee, the payee happens to be a "Friend" on a social networking site, and the payee frequently receives money from the user, payee identity engine 213 could identify the payee as a likely target. Images, addresses, or the like, can also be displayed on the device (possibly gathered from aforementioned sources—such as social networks or public identity aggregators) to better aid the user in deciding which recipient is the proper recipient of the funds.

Similar processes are usable when the process is performed by a user requesting money. That is, when a user is attempting to collect, for example, on a past bill, the device may implement functions on payee identity engine 213 to determine the likely identity of the payer. This would enable a requesting payee to better determine who he is requesting payment from, and make sure that he is not opening communication with someone who does not actually owe the payee money.

Step 1103 may also, in some embodiments, enable the user to decide on a particular method of communication with the payee, and enable that communication to take place. For example, messaging engine 221 may be utilized to begin communication between the two parties over the aforementioned social networks, email, text messaging, or the like. This can enable communication to take place before, during, or after the payment transaction has taken place.

At step 1105, a payment channel may be chosen by the user. PPG 102 may execute instructions to provide mechanisms that facilitate the payer to send the payment. Routing option engine 217, in some embodiments, may be configured to suggest routing options by considering factors including, for example, type of payment, available information of an intended payee, location of the payee, transaction history, the payer or the intended payee's preferred routing options, etc. In some embodiments, routing option engine 217 may be configured to rank the suggested routing options by multiple parameters such as, for example, safety, speed, cost, stability, history (e.g., customer experience), and etc.

Additionally, as part of step 1105, initial connections and interfaces may be made to payment networks. For example, payment companies such as clearXchange, Dwolla, PayPal, ViaFone, banking institutions, or the like, may all be interacted with to determine the payment rails that are appropriate for use between the payer and the payee.

Additionally or alternatively, to assist the payee to select the routing option, PPG 102 and/or routing option engine 217 may be configured to provide commercial messages to the payee associated with one or more routing options. For example, if a routing option requires the payee to open a new bank account with financial service provider 110, the payee may receive some commercial message relating to the incentives to open a new bank account. Messaging engine 221 may be configured to determine what message to display to the payee. The determination may be based on the occasion and the type of the payment, among other considerations.

In some embodiments, some routing options may involve some cost, and in these situations, PPG 102 may be configured to suggest routing options based on such considerations as well. And, once a particular routing option involving cost becomes selected, PPG 102 may be configured to determine how to distribute the cost associated with the routing option at step 1105. In some embodiments, the payer may choose a way to distribute the cost. For example, the payer may bear the cost on his/her own, share the cost with the payee, or choose to have the payee to bear the cost. In other embodiments, PPG 102 may be configured to provide mechanisms that allow the payer to prohibit the use of some routing option(s) involving cost.

Step 1107 involves functionality for actually sending the payment. Using the above-mentioned determined payment rails, determined payee identity, and with the previously-mentioned messaging components, payment may be sent to the payee. Step 1107 may also involve functionality to allow the payer to select a payment type. In some embodiment, if the payer initially chooses to send the payment by cash and enters into the amount of money he/she wants to transfer, PPG 102 may be configured to provide alternative payment types (e.g., sending a gift card instead of money). In other embodiments, based on the information about the intended payee and the payment type, PPG 102 may be configured to determine whether the payment is for a particular purpose, such as, the intended payee's birthday. If the particular purpose is confirmed, PPG 102 may be configured to execute instructions to perform functions consistent with the disclosed embodiments such as, for example, suggesting alternative payment type (e.g., purchase of an item appearing on the "wish list" of an online account associated with the payee), allowing the payer to send a birthday card or upload a picture or a video together with the payment.

Step 1107 may also involve functionality for enabling the payer to choose a funding source to fund his/her payment. In some embodiments, funding source engine 215 (some embodiments were discussed in greater detail above) may be configured to determine available funding sources to make the payment, which may be internal and/or external to financial service provider 110. In other embodiments, funding source engine 215 may be configured to estimate preferred source(s) of funds and determine which one(s) to suggest to the payer.

In addition, in some embodiments, PPG 102 may receive notification that the payee has refused the payment (step 1109). PPG 102 may receive an indication that the payment was refused because, for example, the amount of the payment was incorrect or the user has already been paid back (either through the disclosed systems, in person, or through another means). In some embodiments, a communication may be sent back to the payer to inform him of the refused payment.

Step 1109 involves functionality for receiving a payment at the payee's end. To assist the payee in receiving the payment in a flexible and timely manner, PPG 102 may be configured to perform functions including, for example, sending a notice to the payee informing him/her of the incoming payment, providing the payee with the option to reject or accept the payment, suggesting routing options to receive the payment, and providing the option of receiving the payment immediately if the selected routing option has a wait time to deliver the payment. PPG 102 may be configured to provide a notice to the payee informing him/her of the incoming payment according to some embodiments. For example, the previously-mentioned social networks, email systems, and text messaging operations can be used to send messages to the recipient. Other communications methods are possible, and will be recognized by one of ordinary skill in the art.

PPG 102 may be configured to perform mechanisms that allow the payee to either accept or reject the incoming payment according to some embodiments. In some embodiments, PPG 102 may be configured to provide mechanisms that allow the payee to provide reasons for rejecting the incoming payment, which may include, for example, the payment amount is incorrect.

Once the payee accepts the payment, PPG 102 may be configured to provide the payee with routing options for receiving the payment according to some embodiments. In some embodiments, routing option engine 217 of PPG 102 (some embodiments were discussed in greater detail above) may be configured to suggest routing options by considering factors including, for example, type of payment, available information of an intended payee, location of the payee, transaction history, the payer or the intended payee's preferred routing options, and the like. In some embodiments, routing option engine 217 may rank suggested options by multiple parameters such as, for example, safety, speed, cost, stability, history (e.g., customer experience), etc. In other embodiments, routing option engine 217 may be configured to determine which rails are best fits for the payee and which rails should be offered to the payee.

Depending on the selected routing option, the payee may not receive immediate payment. For example, if the payer deposits some money directly into the payee's bank account, the payee may be restricted from withdrawing or using the payment immediately. Credit decision engine 219 of PPG 102 may be configured to determine whether the payee is willing and eligible to apply for credit advances. And credit decision engine 219 may be configured to provide mechanisms that allow the payee to apply for credit advances once such a determination is made.

In some embodiments, PPG 102 may execute instructions to facilitate the payee to redirect the received payment to another recipient, as shown in FIG. 11 at step 1111. In these situations, the payee may act as the payer. For example, PPG 102 may be configured to determine available allocating options to redirect a received payment of the payee (some embodiments were discussed in greater detail above). In some embodiments, if the payee received a gift card, the payer may receive some commercial message relating to the incentive (e.g. receive a discount) to use the payment with some vendors.

Figure 12:
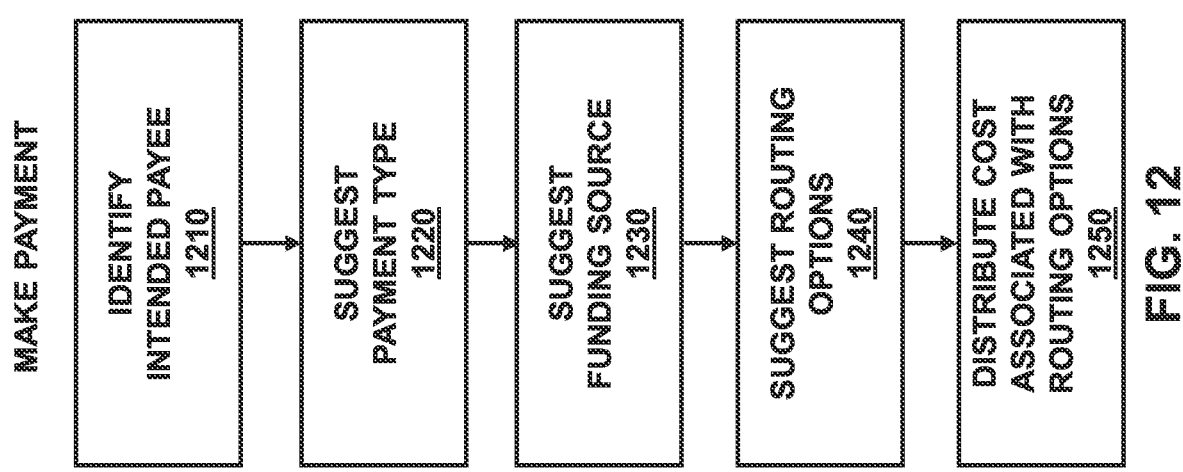
FIG. 12 is an exemplary process for sending a payment, in accordance with various embodiments.

As illustrated in FIG. 12 according to some embodiments, PPG 102 may be configured to execute instructions to facilitate the payer to send the payment. To facilitate the payer to send the payment in a flexible and convenient way, PPG 102 may be configured to perform functions including, for example, identifying the intended payee by requesting minimum input from the payer (step 1210), suggesting payment type (step 1220), suggesting funding source to fund the payment (step 1230), suggesting routing source to rail the payment (step 1240), and providing mechanism that allow the payer to distribute cost associated with some routing options (step 1250).

At step 1210, based on some input from the payer with respect to his/her intended payee (e.g. payee's name), payee identity engine 213 (some embodiments of its functions were discussed in greater detail above) may be configured to provide some suggested recipients that could potentially be the payee, together with further information for the payer to identity the payee (e.g. suggested recipients' addresses and/or phone numbers and/or ages, level of confidence, data sources used). The payer thus may identity his/her intended payee based on this information. Additionally or alternatively, the payer may also provide feedback to PPG 102 if the intended payee is not included in the suggested recipients.

At step 1220, PPG 102 may execute instructions to allow the payer to select a payment type. In some embodiment, if the payer initially chooses to send the payment by cash and enters into the amount of money he/she wants to transfer, PPG 102 may be configured to provide alternative payment types (e.g. sending a gift card instead of money). In some embodiments, based on the information about the intended payee and the payment type, PPG 102 may be configured to determine whether the payment is for a particular purpose, such as, the intended payee's birthday. If the particular purpose is confirmed, PPG 102 may be configured to execute instructions to perform functions consistent with the disclosed embodiments such as, for example, suggesting alternative payment type (e.g. purchase of an item appearing on the "wish list" of an online account associated with the payee), allowing the payer to send a birthday card or upload a picture or a video together with the payment.

At step 1230, PPG 102 may be configured to perform functions that enable the payer to choose a funding source to fund his/her payment. In some embodiments, funding source engine 215 (some embodiments were discussed in greater detail above) may be configured to determine available funding sources to make the payment, which may be internal and/or external to financial service provider 110. In other embodiments, funding source engine 215 may be configured to estimate preferred source(s) of funds and determine which one(s) to suggest to the payer.

At step 1240, PPG 102 may also be configured to provide mechanisms that allow the payer to select a rail to route his/her payment. In some embodiments, routing option engine 217 of PPG 102 (some embodiments were discussed in greater detail above) may be configured to suggest routing options by considering factors including, for example, type of payment, available information of an intended payee, location of the payee, transaction history, the payer or the intended payee's preferred routing options, etc. In some embodiments, routing option engine 217 may be configured to rank the suggested routing options by multiple parameters such as, for example, safety, speed, cost, stability, history (e.g., customer experience), and etc. Additionally or alternatively, PPG 102 may be configured to provide mechanisms that allow the payer and the payee to communicate with each other during the process of making the payment, and thus, the payer may learn of the payee's preferred routing option(s) via communication with the payee and may accordingly choose the routing option for the payment.

In some embodiments, some routing options may involve some cost, and in these situations, PPG 102 may be configured to suggest routing options based on such considerations as well. And, once a particular routing option involving cost is selected, PPG 102 may be configured to determine how to distribute the cost associated with the routing option at step 1250. In some embodiments, the payer may choose a way to distribute the cost. For example, the payer may bear the cost on his/her own, share the cost with the payee, or choose to have the payee to bear the cost. In other embodiments, PPG 1202 may be configured to provide mechanisms that allow the payer to prohibit the use of some routing option(s) involving cost.

Figure 13:
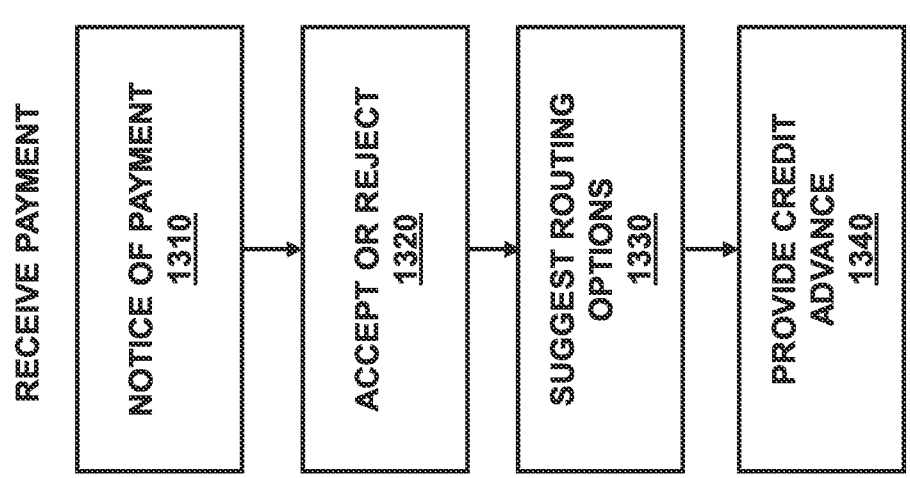
FIG. 13 is an exemplary process for receiving a payment, in accordance with various embodiments.

As illustrated in FIG. 13 according to some embodiments, PPG 102 may be configured to execute instructions to process the receipt of the payment. To assist the payee in receiving the payment in a flexible and timely manner, PPG 102 may be configured to perform functions including, for example, sending a notice to the payee informing him/her of the incoming payment (step 1310), providing the payee with the option to reject or accept the payment (step 1320), suggesting routing options to receive the payment (step 1330), and providing the option of receiving the payment immediately if the selected routing option has a wait time to deliver the payment (step 1340).

At step 1310, PPG 102 may be configured to provide a notice to the payee informing him/her of the incoming payment consistent with some embodiments. In some embodiments, messaging engine 221 may be configured to determine the appropriate medium or media to deliver the notification to the payee (or a payer if the payee initiates the payment request). Based on the determination, PPG 102 may execute software that delivers the notice to the payee and/or the payer via one or more media including, for example, text messages, email, or social networking sites (e.g., Facebook, Twitter, etc.). If the payer or the payee is a user of PPG 102, PPG 102 may execute software that delivers the notice directly to client 114.

At step 1320, PPG 102 may be configured to perform mechanisms that allow the payee to either accept or reject the incoming payment according to some embodiments. In some embodiments, PPG 102 may be configured to provide mechanisms that allow the payee to provide reasons for rejecting the incoming payment, which may include, for example, the payment amount is incorrect.

At step 1330, once the payee accepts the payment, PPG 102 may be configured to provide the payee with routing options for receiving the payment according to some embodiments. In some embodiments, routing option engine 217 of PPG 102 (some embodiments were discussed in greater detail above) may be configured to suggest routing options by considering factors including, for example, type of payment, available information of an intended payee, location of the payee, transaction history, the payer or the intended payee's preferred routing options, and the like. In some embodiments, routing option engine 217 may rank suggested options by multiple parameters such as, for example, safety, speed, cost, stability, history (e.g., customer experience), etc. In other embodiments, routing option engine 217 may be configured to determine which rails are best fits for the payee and which rails should be offered to the payee.

Additionally or alternatively, to assist the payee to select the routing option, PPG 102 may be configured to provide commercial messages to the payee associated with one or more routing options. For example, if a routing option requires the payee to open a new bank account with financial service provider 110, the payee may receive some commercial message relating to the incentives to open a new bank account. Messaging engine 221 of PPG 102 (some embodiments were discussed in greater detail above) may be configured to determine what message to display to the payee. The determination may be based on the occasion and the type of the payment, among other considerations.

Depending on the selected routing option, the payee may not receive immediate payment. For example, if the payer deposits some money directly into the payee's bank account, the payee may not withdraw or use the payment immediately. At step 1340, credit decision engine 219 of PPG 102 (some embodiments were discussed above) may be configured to determine whether the payee is willing and eligible for credit advance. And credit decision engine 219 may be configured to provide mechanisms that allow the payee to apply credit advance once the determination is made.

In some embodiments, PPG 102 may execute instructions to facilitate the payee to redirect the received payment to another recipient. In these situations, the payee may act as the payer. For example, PPG 102 may be configured to determine available allocating options to redirect a received payment of the payee (some embodiments were discussed in greater detail above). In some embodiments, if the payee received a gift card, the payer may receive some commercial message relating to the incentive (e.g. receive a discount) to use the payment with some vendors.

The disclosed embodiments may be associated to different types of financial service accounts. Any financial institution that provides financial service accounts to customers may employ systems, methods, and articles of manufacture consistent with some principles related to the disclosed embodiments. In addition, other types of entities, such as a merchant, retailer, or other type corporate entity that may also employ systems, methods, and articles of manufacture consistent with some disclosed embodiments.

Furthermore, although embodiments of the disclosed embodiments are described as being associated with data stored in memory and other tangible computer-readable storage mediums, one skilled in the art will appreciate that these embodiments can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

In some embodiments, the processes performed by any of the components of PPG 102 are not limited to those components. For example, the processes described herein that may be performed by interface design engine 210 may be performed by software instructions not necessarily limited to an interface design engine. For instance, PPG 102 may be configured with software program or programs that perform the processes described above associated with one or more of the engines shown in and described in connection with FIG. 2.

What is claimed is:

1. A system for providing personal payment transactions, the system comprising:
   one or more processors; and
   storage media storing instructions that, when executed by the one or more processors, cause the system to perform operations comprising:
   determining a technical experience level for a payer or a payee based on one or more of the following associated with the payer or payee: age, commercial activities, input provided during a set up procedure related to a payment transaction system, information gathered from social networking sites, or prior usage of an application;
   generating, based on proximity detection of payees to the payer, one or more first interfaces to effectuate a personal payment transaction by:
   obtaining, via the one or more first interfaces, a location of a user device associated with the payer; and
   providing, based on the obtained location of the user device, suggested payees on the one or more first interfaces;
   obtaining, from the payer via the one or more first interfaces, an indication of a selected payee from the suggested payees;
   providing, on the one or more first interfaces, options to fund a personal payment to the selected payee;
   generating one or more second interfaces for the selected payee; and
   providing, to the payer via the one or more first interfaces and to the selected payee via the one or more second interfaces, one or more options to route the personal payment associated with the personal payment transaction, wherein the one or more options comprise a payment rail determined based on rankings by other users with respect to security or speed of the payment rail,
   wherein generating at least one of the one or more first interfaces comprises customizing at least one of the one or more first interfaces based on the technical experience level.

2. The system of claim 1, wherein generating the one or more first interfaces comprises generating an interface that includes one or more channels for the payer to communicate with the selected payee regarding the personal payment transaction.

3. The system of claim 1, the operations further comprising:
  estimating a confidence level corresponding to each suggested payee of the suggested payees, the confidence level indicating a likelihood that the suggested payee is an intended payee; and
  providing the estimated confidence levels for the suggested payees on the one or more first interfaces.

4. The system of claim 1, wherein obtaining the location comprises obtaining global positioning system (GPS) information from the user device via the one or more first interfaces.

5. A method for providing a person payment transaction, the method comprising:
  determining, by one or more processors, a technical experience level for a payer or a payee based on one or more of the following associated with the payer or payee: age, commercial activities, input provided during a set up procedure related to a payment transaction system, information gathered from social networking sites, or prior usage of an application;
  generating, by one or more processors, one or more first interfaces for a payer to effectuate a personal payment transaction;
  obtaining, by one or more processors, a location of a user device associated with the payer;
  providing, by one or more processors, based on the obtained location of the user device, one or more suggested payees on the one or more first interfaces;
  obtaining, by one or more processors, from the payer via the one or more first interfaces, an indication of a selected payee from the one or more suggested payees;
  providing, by one or more processors, on the one or more first interfaces, options to fund a personal payment to the selected payee; and
  providing, by one or more processors, to the payer via the one or more first interfaces and to the selected payee via one or more second interfaces, one or more options to route the personal payment associated with the personal payment transaction, wherein the one or more options comprise a payment rail determined based on rankings by other users with respect to one or more characteristics of the payment rail,
  wherein generating at least one of the one or more first interfaces comprises customizing at least one of the one or more first interfaces based on the technical experience level.

6. The method of claim 5, wherein generating the one or more first interfaces comprises generating an interface that includes one or more channels for the payer to communicate with the selected payee regarding the personal payment transaction.

7. The method of claim 5, further comprising:
  estimating a confidence level corresponding to each suggested payee of the one or more suggested payees, the confidence level indicating a likelihood that the suggested payee is an intended payee; and
  providing the estimated confidence levels for the one or more suggested payees on the one or more first interfaces.

8. The method of claim 5, further comprising:
  determining, based on the obtained location of the user device, physical proximities of users of a set of users to the payer; and
  selecting, based on the physical proximities of users, the one or more suggested payees from the set of users.

9. The method of claim 5, wherein obtaining the location comprises obtaining global positioning system (GPS) information from the user device via the one or more first interfaces.

10. The method of claim 5, wherein obtaining the location comprises obtaining the location of the user device via a social media update associated with the payer.

11. The method of claim 5, wherein the one or more options comprise a respective payment rail determined based on rankings by other users with respect to security or speed of the respective payment rail.

12. The method of claim 5, wherein the one or more options comprise a respective payment rail determined based on rankings by other users with respect to history, cost, or stability of the respective payment rail.

13. One or more non-transitory computer-readable media storing instructions that, when executed by one or more processors, cause operations comprising:
  determining, by one or more processors, a technical experience level for a payer or a payee based on one or more of the following associated with the payer or payee: age, commercial activities, input provided during a set up procedure related to a payment transaction system, information gathered from social networking sites, or prior usage of an application;
  generating, based on proximity detection of payees to a payer, one or more first interfaces to effectuate a personal payment transaction by:
    obtaining a location of a user device associated with the payer; and
    providing, based on the obtained location of the user device, one or more suggested payees on the one or more first interfaces;
  obtaining, from the payer via the one or more first interfaces, an indication of a selected payee from the one or more suggested payees;
  providing, for presentation on the one or more first interfaces, options to fund a personal payment to the selected payee; and
  providing, to the payer via the one or more first interfaces, one or more options to route the personal payment associated with the personal payment transaction,
  wherein generating at least one of the one or more first interfaces comprises customizing at least one of the one or more first interfaces based on the technical experience level.

14. The media of claim 13, wherein generating the one or more first interfaces comprises generating an interface that includes one or more channels for the payer to communicate with the selected payee regarding the personal payment transaction.

15. The media of claim 13, further comprising:
  estimating a confidence level corresponding to each suggested payee of the one or more suggested payees, the confident level indicating a likelihood that the suggested payee is an intended payee; and
  providing the estimated confidence levels for the one or more suggested payees for presentation on the one or more first interfaces.

16. The media of claim 13, further comprising:
  determining, based on the obtained location of the user device, physical proximities of users of a set of users to the payer; and
  selecting, based on the physical proximities of users, the one or more suggested payees from the set of users.

17. The media of claim 13, wherein obtaining the location comprises obtaining global positioning system (GPS) information from the user device via the one or more first interfaces.

18. The media of claim 13, wherein obtaining the location comprises obtaining the location of the user device via a social media update associated with the payer.

19. The media of claim 13, wherein the one or more options comprise a respective payment rail determined based on rankings by other users with respect to security or speed of the payment rail.

20. The media of claim 13, wherein the one or more options comprise a respective payment rail determined based on rankings by other users with respect to history, cost, or stability of the payment rail.

\* \* \* \* \*